US012326979B2

(12) United States Patent
Gigie et al.

(10) Patent No.: US 12,326,979 B2
(45) Date of Patent: Jun. 10, 2025

(54) SYSTEM AND METHOD FOR ACOUSTIC BASED GESTURE TRACKING AND RECOGNITION USING SPIKING NEURAL NETWORK

(71) Applicant: Tata Consultancy Services Limited, Mumbai (IN)

(72) Inventors: Andrew Gigie, Bangalore (IN); Arun George, Bangalore (IN); Achanna Anil Kumar, Bangalore (IN); Sounak Dey, Kolkata (IN); Kuchibhotla Aditi, Bangalore (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 421 days.

(21) Appl. No.: 17/813,376

(22) Filed: Jul. 19, 2022

(65) Prior Publication Data
US 2023/0168743 A1 Jun. 1, 2023

(30) Foreign Application Priority Data
Oct. 24, 2021 (IN) .............................. 202121048453

(51) Int. Cl.
| | | |
|---|---|---|
| G06F 3/01 | (2006.01) | |
| G01S 15/62 | (2006.01) | |
| G01S 15/66 | (2006.01) | |

(52) U.S. Cl.
CPC .............. *G06F 3/017* (2013.01); *G01S 15/62* (2013.01); *G01S 15/66* (2013.01)

(58) Field of Classification Search
CPC . G01S 7/54; G01S 15/66; G01S 15/62; G01S 7/534; G01S 7/536; G01S 7/554;
(Continued)

(56) References Cited

FOREIGN PATENT DOCUMENTS

CN 109361376 A 2/2019

OTHER PUBLICATIONS

Xing et al. ("A New Spiking Convolutional Recurrent Neural Network (SCRNN) With Applications to Event-Based Hand Gesture Recognition", Frontiers in neuroscience 14 (2020)) (Year: 2020).*

(Continued)

*Primary Examiner* — Yuqing Xiao
*Assistant Examiner* — Christopher Richard Walker
(74) *Attorney, Agent, or Firm* — Finnegan, Henderson, Farabow, Garrett & Dunner, LLP

(57) ABSTRACT

Gesture recognition is a key requirement for Human Computer Interaction (HCI) and multiple modalities are explored in literature. Conventionally, channel taps are estimated using least square based estimation and tap corresponding to finger motion is tracked. These assume that noise component is negligible and can reduce the tracking accuracy for low SNR. Thus, to mitigate the above-mentioned limitation, the system and method of the present disclosure explore the feasibility of using speaker and microphone setup available in most of smart devices and transmit inaudible frequencies (acoustic) for detecting the human finger level gestures accurately. More specifically, System implements the method for millimeter level finger tracking and low power gesture detection on this tracked gesture. The system uses a subspace based high resolution technique for delay estimation and use microphone pairs to jointly estimate the multi-coordinates of finger movement.

16 Claims, 16 Drawing Sheets

(58) Field of Classification Search
CPC .. G01S 15/876; G06F 3/017; G06F 18/24143; G06N 3/0464; G06N 3/049; G06N 3/0495; G06N 3/09
See application file for complete search history.

(56) References Cited

OTHER PUBLICATIONS

Tsang et al. ("Radar-Based Hand Gesture Recognition Using Spiking Neural Networks", Electronics 2021, 10, 1405) (Year: 2021).*
Zhengjie Wang et al., "Hand Gesture Recognition Based on Active Ultrasonic Sensing of Smartphone: A Survey." IEEE Access, Aug. 2019, IEEE, https://ieeexplore.ieee.org/ielx7/6287639/8600701/08792172.pdf.
Ahmed Ibrahim et al., "Pervasive Hand Gesture Recognition for Smartphones using Non-audible Sound and Deep Learning," Machine Learning—Audio and Speech Processing, Aug. 2021, Arxiv, https://arxiv.org/pdf/2108.02148.pdf.
Ing Jyh Tsang et al, "Radar-Based Hand Gesture Recognition Using Spiking Neural Networks," Electronics, Jun. 2021, MDPI, https://www.mdpi.com/2079-9292/10/12/1405.
Jibin Wu et al, "A Spiking Neural Network Framework for Robust Sound Classification," Neurosceince, Nov. 2018, Frontiers, https://www.frontiersin.org/articles/10.3389/fnins.2018.00836/full.

* cited by examiner

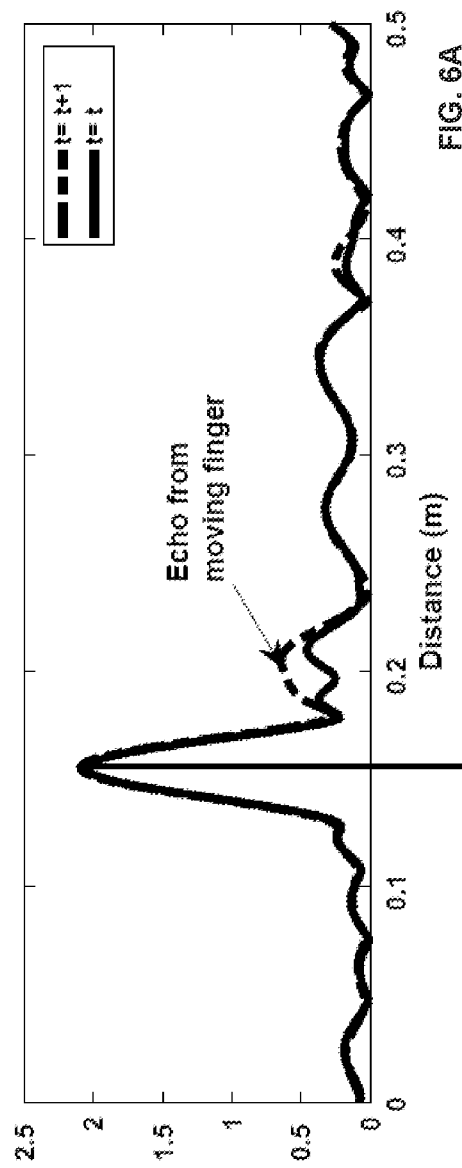
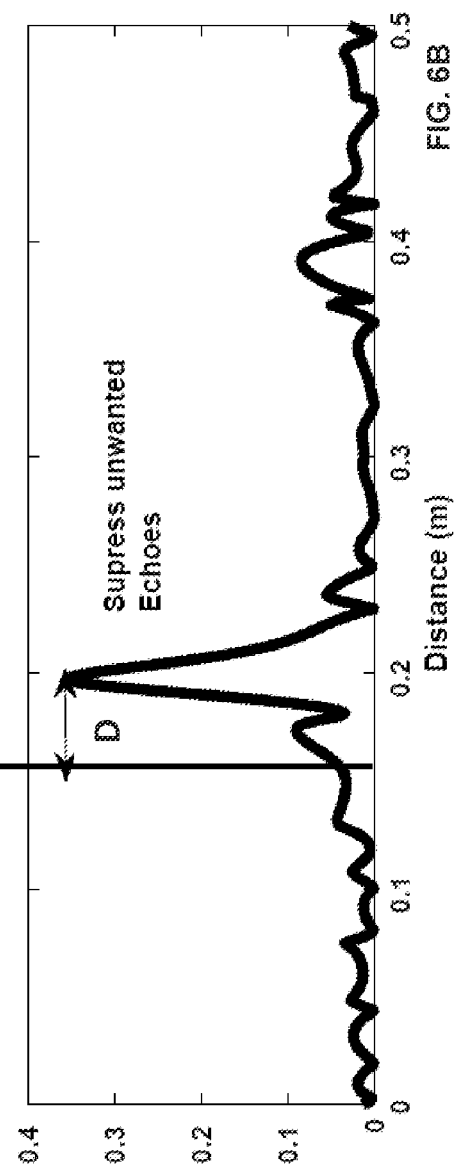
FIG. 6A
FIG. 6B

SYSTEM AND METHOD FOR ACOUSTIC BASED GESTURE TRACKING AND RECOGNITION USING SPIKING NEURAL NETWORK

PRIORITY CLAIM

This U.S. patent application claims priority under 35 U.S.C. § 119 to: Indian Patent Application number 202121048453, filed on Oct. 24, 2021. The entire contents of the aforementioned application are incorporated herein by reference.

TECHNICAL FIELD

The disclosure herein generally relates to the field of gesture recognition, and, more particularly, to system and method for acoustic based gesture tracking and recognition using spiking neural network.

BACKGROUND

Gesture recognition is a key requirement for Human Computer Interaction (HCI) and multiple modalities are explored in literature. Camera based modality helps to detect complex gestures with good accuracy, but it fails in scenarios of low lighting and has privacy related concerns. Wearable sensor/device-based methods also exist for gesture detection, but it requires the user to wear the wearable device while performing the gesture. RF based sensing such as WiFi and radar cannot detect fine mm level gestures accurately due to its higher wavelength. Radar based sensing also has additional cost constraints and are not often easily available.

Acoustic based techniques also exist in literature. Conventionally in research works, authors have computed images using the principle of doppler and channel impulse response to classify distinct gestures. However, these approaches would fail in applications where accurate tracking of hand gestures is necessary. Fine tracking of human gestures is also explored in prior art. In another research work, the authors have used the principle of time of arrival using OFDM signals to track the hand gestures. However, the maximum resolution is limited by the one sample shift and is dependent on the sampling frequency. In yet another research work, authors have used the phase information of the acoustic signal to detect device free gesture tracking. In a further research work, authors proposed an approach wherein the phase information is mixed and is difficult to decouple finger motion in the presence of other motions. All the above approaches mentioned have been compared and are shown to be limited by the resolution of tracking.

SUMMARY

Embodiments of the present disclosure present technological improvements as solutions to one or more of the above-mentioned technical problems recognized by the inventors in conventional systems. For example, in one aspect, there is provided a processor implemented method for acoustic based gesture tracking and recognition using spiking neural network. The method comprises transmitting, via a waveform transmitter, a filtered signal having a band limited random waveform to a user; receiving, via a plurality of microphones, a reflecting signal from the user, in response to the transmitted filtered signal; pre-processing the reflecting signal to obtain a pre-processed signal comprising a real component and an imaginary component; performing an autocorrelation of the transmitted filtered signal to obtain an autocorrelated signal; applying a windowed filter on the autocorrelated signal to obtain a windowed autocorrelation output; performing a cross correlation to every frame of the pre-processed signal comprising the real component and the imaginary component with reference to the transmitted filtered signal to obtain a cross correlated signal; estimating a difference for every consecutive frames of the cross correlated signal; applying a shifted windowed filter on the difference based on a comparison between the difference and a pre-defined threshold to obtain a windowed difference cross correlation output; computing a delay corresponding to each of the plurality of microphones based on the windowed autocorrelation output and the windowed difference cross correlation output; tracking a plurality of multi-coordinate finger position based on (i) the delay corresponding to each of the plurality of microphones and (ii) a common intersection between one or more ellipses formed with the plurality of microphones and the waveform transmitter using the delay; and recognizing, via a Spike Neural Network (SNN), a gesture performed by the user based on the plurality of multi-coordinate finger positions.

In an embodiment, the step of transmitting, via a waveform transmitter, a filtered signal having a band limited random waveform is preceded by: generating a transmitting signal; interpolating the generated transmitted signal to obtain an interpolated signal; appending one or more frames of the interpolated signal with zeros to obtain an interpolated and padded signal; modulating the interpolated and padded signal to obtain a modulated signal; and passing the modulated signal to a band pass filter to obtain the filtered signal.

In an embodiment, the step interpolating the generated transmitted signal to obtain an interpolated signal is performed to reduce bandwidth of the transmitted filtered signal such that an associated frequency is within a pre-defined frequency threshold.

In an embodiment, the step of pre-processing the reflecting signal to obtain a pre-processed signal having a real component and an imaginary component comprises applying quadrature demodulation to the reflecting signal to obtain a demodulated signal; filtering the demodulated signal to obtain a low pass filter signal; and extracting the real component and the imaginary component from the low pass filter signal.

In an embodiment, width of the windowed filter is based on width comprised in the autocorrelated signal.

In an embodiment, the windowed difference magnitude cross correlation output is further based on a range of distance of the user from the plurality of microphones.

In an embodiment, the step of recognizing, via a Spike Neural Network (SNN), a gesture performed by the user based on the plurality of multi-coordinate finger positions comprises converting the plurality of multi-coordinate finger positions to a spike-domain; extracting, one or more features of the spike-domain using one or more spiking neurons comprised in the SNN; and recognizing the gesture of the figure from the extracted one or more features by using the SNN.

In an embodiment, the spike neural network is obtained by: training a Convolutional Neural Network (CNN) using training data comprising a plurality of multi-coordinate mapped finger positions corresponding to one or more users to obtain a trained CNN; quantizing the trained CNN to obtain a quantized CNN; and converting the quantized CNN to the SNN.

In another aspect, there is provided a processor implemented system for acoustic based gesture tracking and recognition using spiking neural network. The system comprises: a memory storing instructions; one or more communication interfaces; and one or more hardware processors coupled to the memory via the one or more communication interfaces, wherein the one or more hardware processors are configured by the instructions to: transmit, via a waveform transmitter, a filtered signal having a band limited random waveform to a user; receive, via a plurality of microphones, a reflecting signal from the user, in response to the transmitted filtered signal; pre-process the reflecting signal to obtain a pre-processed signal comprising a real component and an imaginary component; perform an autocorrelation of the transmitted filtered signal to obtain an autocorrelated signal; apply a windowed filter on the autocorrelated signal to obtain a windowed autocorrelation output; perform a cross correlation to every frame of the pre-processed signal comprising the real component and the imaginary component with reference to the transmitted filtered signal to obtain a cross correlated signal; estimate a difference for every consecutive frames of the cross correlated signal; apply a shifted windowed filter on the difference based on a comparison between the difference and a pre-defined threshold to obtain a windowed difference cross correlation output; compute a delay corresponding to each of the plurality of microphones based on the windowed autocorrelation output and the windowed difference cross correlation output; track a plurality of multi-coordinate finger position based on (i) the delay corresponding to each of the plurality of microphones and (ii) a common intersection between one or more ellipses formed with the plurality of microphones and the waveform transmitter using the delay; and recognize, via a Spike Neural Network (SNN), a gesture performed by the user based on the plurality of multi-coordinate finger positions.

In an embodiment, prior to transmitting, via a waveform transmitter, a filtered signal having a band limited random waveform, the one or more hardware processors are configured to generate a transmitting signal; interpolate the generated transmitted signal to obtain an interpolated signal; append one or more frames of the interpolated signal with zeros to obtain an interpolated and padded signal; modulate the interpolated and padded signal to obtain a modulated signal; and pass the modulated signal to a band pass filter to obtain the filtered signal.

In an embodiment, the interpolated signal is obtained to reduce bandwidth of the transmitted filtered signal such that an associated frequency is within a pre-defined frequency threshold.

In an embodiment, the pre-processed signal having the real component and the imaginary component is obtained by applying quadrature demodulation to the reflecting signal to obtain a demodulated signal; filtering the demodulated signal to obtain a low pass filter signal; and extracting the real component and the imaginary component from the low pass filter signal.

In an embodiment, width of the windowed filter is based on width comprised in the autocorrelated signal.

In an embodiment, the windowed difference magnitude cross correlation output is further based on a range of distance of the user from the plurality of microphones.

In an embodiment, the gesture performed by the user is recognized based on the plurality of multi-coordinate finger positions by converting the plurality of multi-coordinate finger positions to a spike-domain; extracting, one or more features of the spike-domain using one or more spiking neurons comprised in the SNN; and recognizing the gesture of the figure from the extracted one or more features by using the SNN.

In an embodiment, the spike neural network is obtained by training a Convolutional Neural Network (CNN) using training data comprising a plurality of multi-coordinate mapped finger positions corresponding to one or more users to obtain a trained CNN; quantizing the trained CNN to obtain a quantized CNN; and converting the quantized CNN to the SNN.

In yet another aspect, there are provided one or more non-transitory machine-readable information storage mediums comprising one or more instructions which when executed by one or more hardware processors cause a method for acoustic based gesture tracking and recognition using spiking neural network. The method comprises transmitting, via a waveform transmitter, a filtered signal having a band limited random waveform to a user; receiving, via a plurality of microphones, a reflecting signal from the user, in response to the transmitted filtered signal; pre-processing the reflecting signal to obtain a pre-processed signal comprising a real component and an imaginary component; performing an autocorrelation of the transmitted filtered signal to obtain an autocorrelated signal; applying a windowed filter on the autocorrelated signal to obtain a windowed autocorrelation output; performing a cross correlation to every frame of the pre-processed signal comprising the real component and the imaginary component with reference to the transmitted filtered signal to obtain a cross correlated signal; estimating a difference for every consecutive frames of the cross correlated signal; applying a shifted windowed filter on the difference based on a comparison between the difference and a pre-defined threshold to obtain a windowed difference cross correlation output; computing a delay corresponding to each of the plurality of microphones based on the windowed autocorrelation output and the windowed difference cross correlation output; tracking a plurality of multi-coordinate finger position based on (i) the delay corresponding to each of the plurality of microphones and (ii) a common intersection between one or more ellipses formed with the plurality of microphones and the waveform transmitter using the delay; and recognizing, via a Spike Neural Network (SNN), a gesture performed by the user based on the plurality of multi-coordinate finger positions.

In an embodiment, the step of transmitting, via a waveform transmitter, a filtered signal having a band limited random waveform is preceded by: generating a transmitting signal; interpolating the generated transmitted signal to obtain an interpolated signal; appending one or more frames of the interpolated signal with zeros to obtain an interpolated and padded signal; modulating the interpolated and padded signal to obtain a modulated signal; and passing the modulated signal to a band pass filter to obtain the filtered signal.

In an embodiment, the step interpolating the generated transmitted signal to obtain an interpolated signal is performed to reduce bandwidth of the transmitted filtered signal such that an associated frequency is within a pre-defined frequency threshold.

In an embodiment, the step of pre-processing the reflecting signal to obtain a pre-processed signal having a real component and an imaginary component comprises applying quadrature demodulation to the reflecting signal to obtain a demodulated signal; filtering the demodulated signal to obtain a low pass filter signal; and extracting the real component and the imaginary component from the low pass filter signal.

In an embodiment, width of the windowed filter is based on width comprised in the autocorrelated signal.

In an embodiment, the windowed difference magnitude cross correlation output is further based on a range of distance of the user from the plurality of microphones.

In an embodiment, the step of recognizing, via a Spike Neural Network (SNN), a gesture performed by the user based on the plurality of multi-coordinate finger positions comprises converting the plurality of multi-coordinate finger positions to a spike-domain; extracting, one or more features of the spike-domain using one or more spiking neurons comprised in the SNN; and recognizing the gesture of the figure from the extracted one or more features by using the SNN.

In an embodiment, the spike neural network is obtained by training a Convolutional Neural Network (CNN) using training data comprising a plurality of multi-coordinate mapped finger positions corresponding to one or more users to obtain a trained CNN; quantizing the trained CNN to obtain a quantized CNN; and converting the quantized CNN to the SNN.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 6A depicts a graphical representation illustrating peaks obtained with reference to consecutive time instances (consecutive frames) of the pre-processed signal comprising the real component and the imaginary component with reference to the transmitted filtered signal, in accordance with an embodiment of the present disclosure.

FIG. 6B depicts a graphical representation illustrating a highlighted peak after subtraction and a corresponding distance from the main peak, in accordance with an embodiment of the present disclosure.

DETAILED DESCRIPTION

Figure 1:
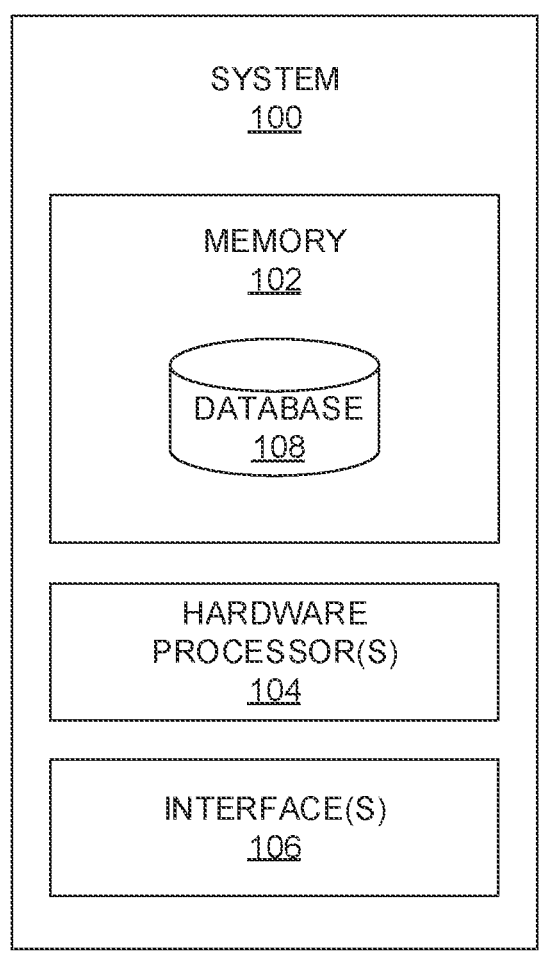
FIG. 1 depicts an exemplary system for acoustic based gesture tracking and recognition using spiking neural network, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned above, in conventional research works, authors have first estimated the channel taps using least square based estimation and track the tap corresponding to finger motion. However least square method assumes that noise component is negligible and can reduce the tracking accuracy for low SNR. Thus, to mitigate the above-mentioned limitations the system and method of the present disclosure explore the feasibility of using speaker and microphone setup available in most of smart devices and transmit inaudible frequencies (acoustic) for detecting the human finger level gestures accurately. Thus, the present disclosure compares performance of its method and system against the above conventional work in both simulation and actual experiments and prove that the method described herein by the present disclosure performs better than the state of the art.

Referring now to the drawings, and more particularly to FIGS. 1 through 14, where similar reference characters denote corresponding features consistently throughout the figures, there are shown preferred embodiments and these embodiments are described in the context of the following exemplary system and/or method.

FIG. 1 depicts an exemplary system 100 for acoustic based gesture tracking and recognition using spiking neural network, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on transmitted signal, reflecting signal, pre-processed signal having real and imaging components. The database 108 further comprises information (or processed information) on autocorrelation, cross correlation, difference estimation, windowed outputs post applying windowed filter(s), delay estimation, multi-coordinate finger position(s) being tracked, and gesture being recognized, and the like. The memory 102 further comprises various technique(s) such as pre-interpolation technique(s), padding technique(s), modulation technique(s), various band pass filter(s), processing technique(s) that include quadrature demodulation technique(s), and the like. Further, the memory 102 further comprises auto correlation technique(s), cross correlation technique(s), windowing technique(s), delay estimation technique(s), gesture recognition technique(s), quantization technique (e) and the like. Furthermore, the memory 102 comprises a Convolution Neural Network (CNN), a trained spike neural network (or a Spike Neural Network (SNN) being trained, and the like. The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
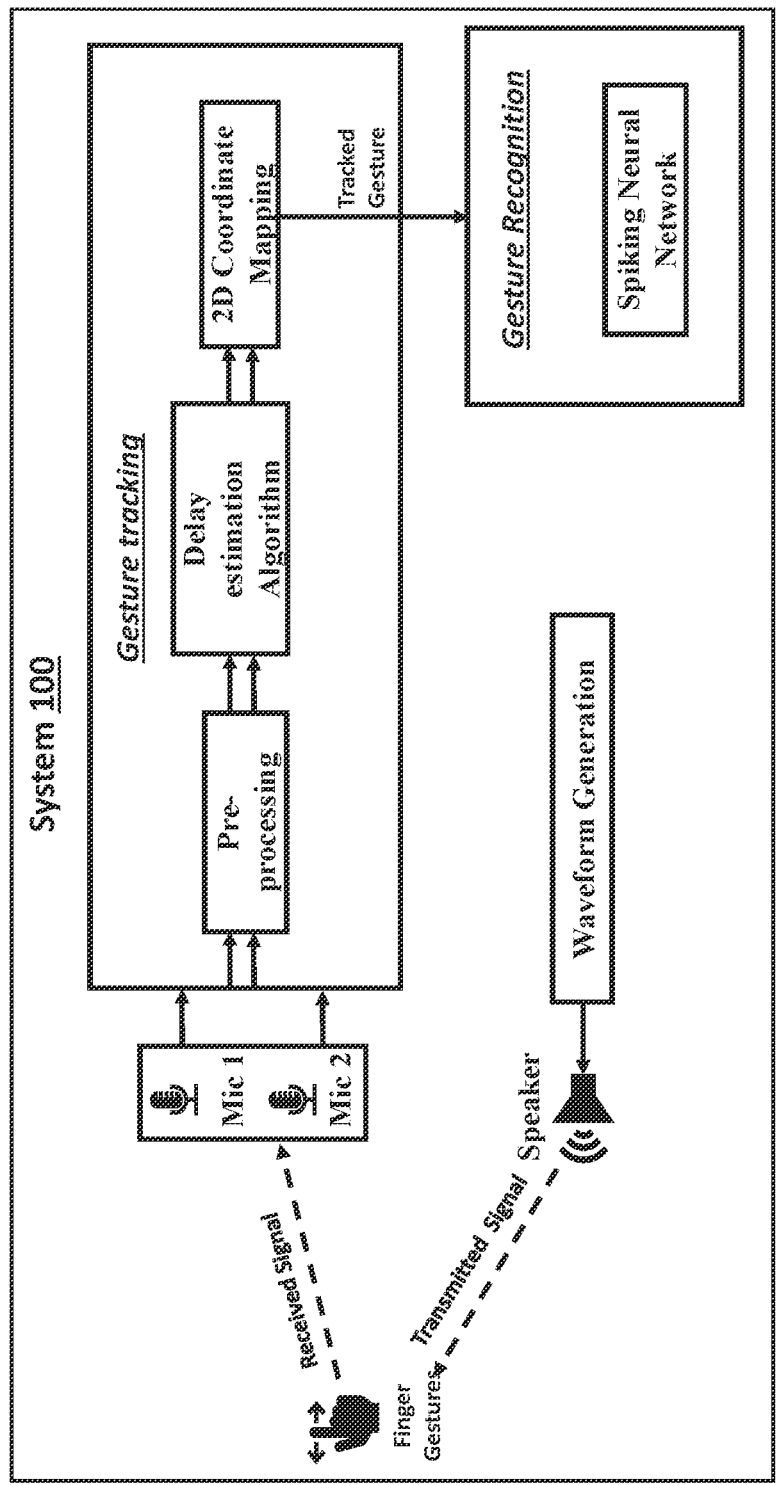
FIG. 2 depict an exemplary high level block diagram of the system for acoustic based gesture tracking and recognition using spiking neural network, in accordance with an embodiment of the present disclosure.

FIG. 2, with reference to FIG. 1, depict an exemplary high level block diagram of the system 100 for acoustic based gesture tracking and recognition using spiking neural network, in accordance with an embodiment of the present disclosure. More specifically, the system 100 in FIG. 2 includes components such as waveform generation block that is configured to generate a filtered signal having a band limited random waveform which is transmitted via a speaker (also referred as waveform transmitter) to user(s), a plurality of microphones configured to receive reflecting signal(s) from user(s), a pre-processing component that is configured to pre-process the reflecting signal(s) to obtain a pre-processed signal with real and imaginary component, a delay estimation algorithm/delay estimation component that is configured to estimate delay corresponding to each of the plurality of microphones, a 2D coordinate mapping (also referred as multi-coordinate mapping component that is configured to track a plurality of multi-coordinate finger position based on (i) the delay corresponding to each of the plurality of microphones and (ii) a common intersection between one or more ellipses formed with the plurality of microphones and the waveform transmitter using the estimated delay, and spiking neural network component that is configured to recognize, based the plurality of multi-coordinate finger position, gesture performed by the user. The above description of each block/component depicted in FIG. 2 is better understood by way of examples and in conjunction with FIG. 3 and/or steps of FIG. 4.

Figure 3:
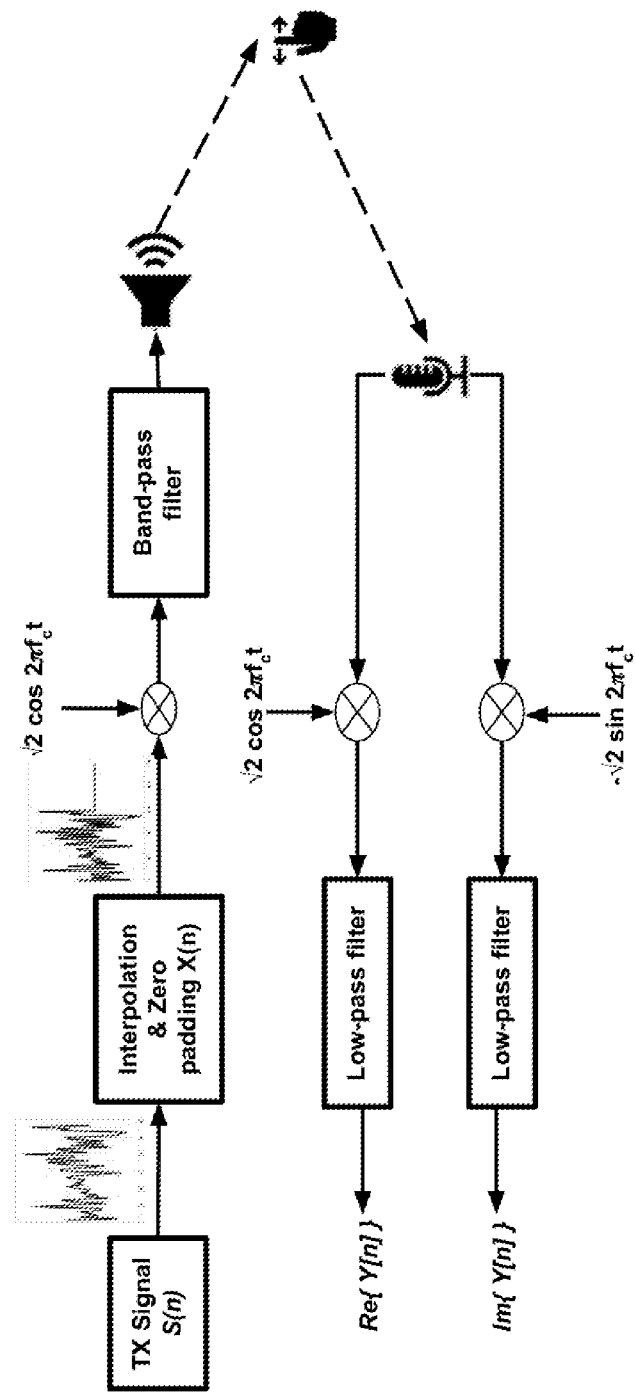
FIG. 3 depicts an exemplary high level block diagram of transmitter and receiver components of the system for acoustic based gesture tracking and recognition using spiking neural network, in accordance with an embodiment of the present disclosure.

FIG. 3, with reference to FIGS. 1-2, depicts an exemplary high level block diagram of transmitter and receiver components of the system 100 for acoustic based gesture tracking and recognition using spiking neural network, in accordance with an embodiment of the present disclosure. In an embodiment, the transmitter components include, but are not limited to, (i) a signal generator that is configured to generate a transmitting signal (e.g., S (n)) as shown in upper portion (e.g., first block) of FIG. 3, (ii) an interpolation and zero padding component that is configured to interpolate the generated transmitted signal to obtain an interpolated signal, and append one or more frames of the interpolated signal with zeros to obtain an interpolated and padded signal, (iii) a modulator (e.g., shown by multiplier symbol in FIG. 3) that is configured to modulate the interpolated and padded signal to obtain a modulated signal, and (iv) a band pass filter (e.g., low pass filter/low band pass filter) that is configured to filter the modulated signal to obtain the filtered signal having band limited random waveform where the filtered signal is transmitted (via a speaker/waveform transmitter) to user(s) as depicted and described in step 202 of FIG. 4. At the receiver component(s) side, the reflecting signal from the user(s) is received by the microphone(s) (e.g., microphones as shown in FIGS. 2 and 3) in response to the transmitted filtered signal, wherein quadrature demodulation is applied by two or more demodulators (e.g., multiplier symbols depicted in below portion of the receiver-refer bottom portion of the system of FIG. 3) to the reflecting signal to obtain a demodulated signal. The demodulated signal is then filter by a corresponding low pass filter (e.g., filters shown in bottom portion of FIG. 3) to obtain low pass filter signal. The pre-processed signal having the real component and the imaginary component are extracted from the low pass filter signal (shown by respective filter unit(s)/components (e.g., low pass filter(s)) wherein real and imaginary components are depicted as outputs (e.g., Re{Y[n]} and Im{Y[n]}) respectively. The above description of each block/component depicted in FIG. 3 is better understood by way of examples and in conjunction with FIG. 2 and/or steps of FIG. 4.

Figure 4A:
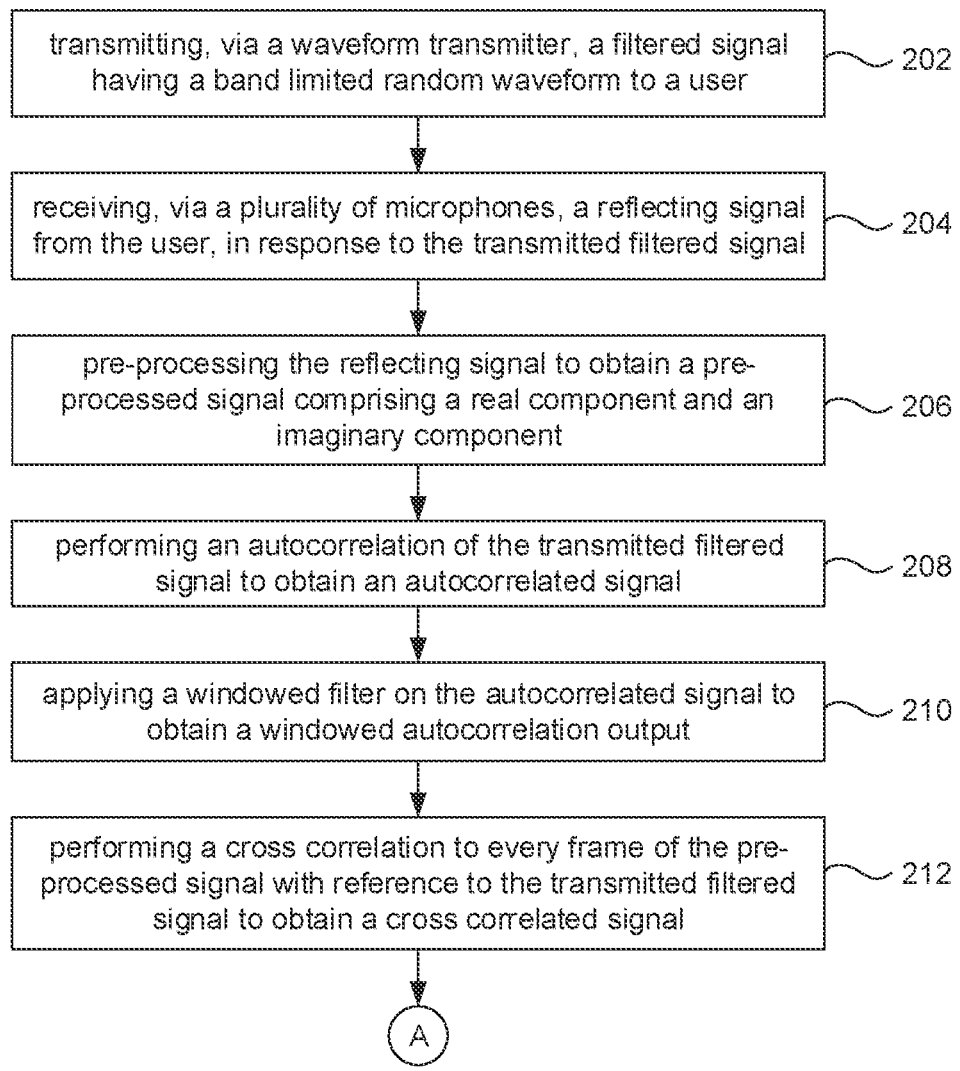
FIGS. 4A and 4B depict an exemplary flow chart illustrating a method for acoustic based gesture tracking and recognition using spiking neural network implemented by the systems of FIG. 1-3, in accordance with an embodiment of the present disclosure.
Figure 4B:
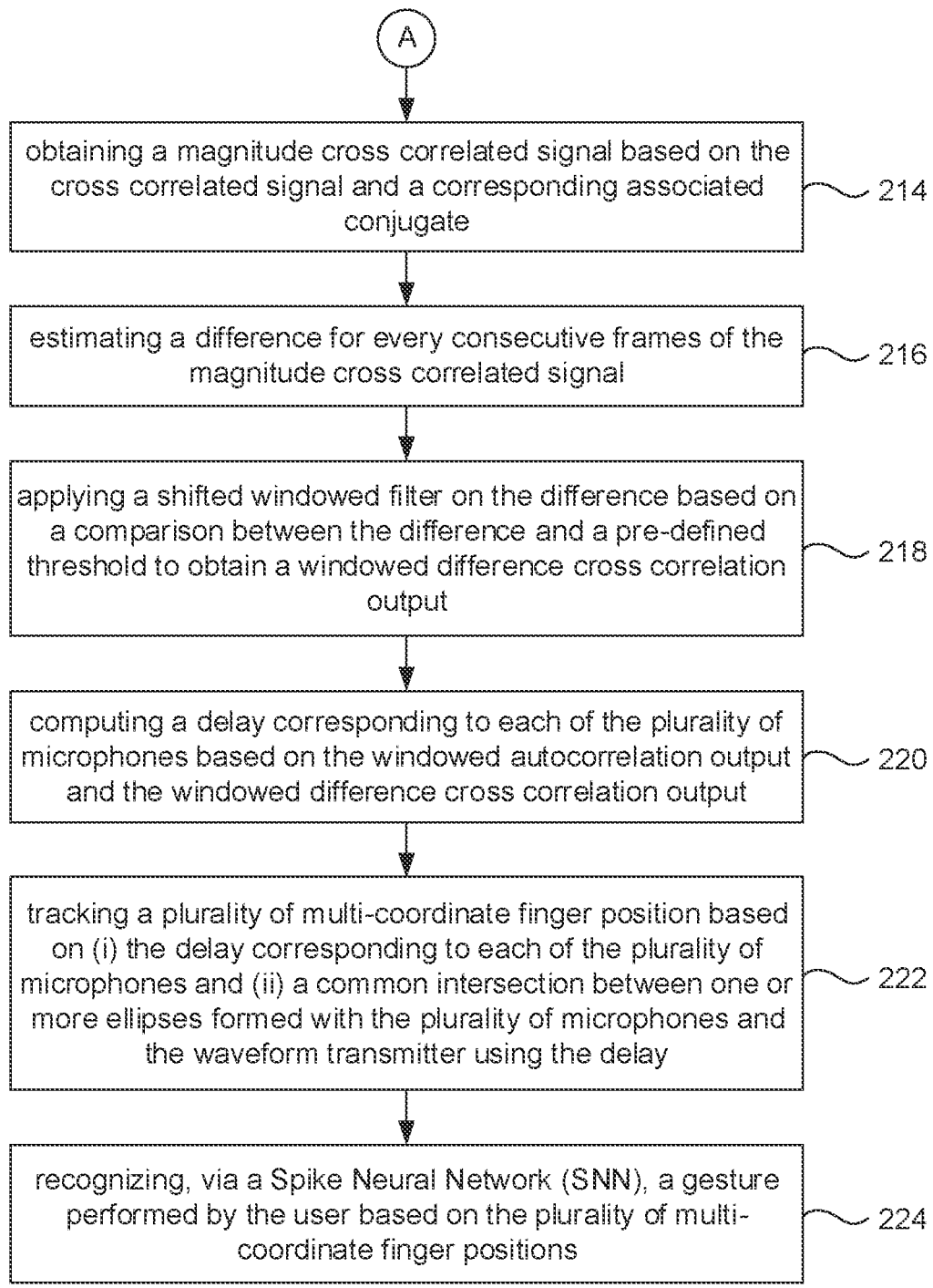

FIGS. 4A and 4B (collectively known as FIG. 4), with reference to FIGS. 1 and 3, depict an exemplary flow chart illustrating a method for acoustic based gesture tracking and recognition using spiking neural network implemented by the systems of FIG. 1-3, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIGS. 2-3, and the flow diagram as depicted in FIG. 4. In an embodiment of the present disclosure, at step 202, the one or more hardware processors 104 transmit, via a waveform transmitter (e.g., a speaker as depicted in FIG. 2), a filtered signal having a band limited random waveform to a user. In the present disclosure, the technique described herein can be extended to any waveform design having good auto correlation properties. Prior to transmitting the filtered signal having the band limited random waveform, the filtered signal is obtained/generated. In other words, the step 202 of transmitting the filtered signal having the band limited random waveform is preceded by obtaining/generating the filtered signal. More specifically, the filter signal is obtained by (i) generating a transmitting signal, (ii) interpolating the generated transmitted signal to obtain an interpolated signal, (iii) appending one or more frames of the interpolated signal with zeros to obtain an interpolated and padded signal, (iv) modulating the interpolated and padded signal to obtain a modulated signal; and (v) passing the modulated signal to a band pass filter to obtain the filtered signal. The above steps (i) to (v) are better understood by way of depiction in FIG. 2. The step of interpolating the generated transmitted signal to obtain an interpolated signal is performed to reduce bandwidth of the transmitted filtered signal such that an associated frequency is within a pre-defined frequency threshold. The above steps may be further better understood by way of following description:

The present disclosure and the system and method described herein explore the feasibility of using band-limited random signal/waveform as the transmitted signal waveform (filtered signal). To make the transmitted/filtered signal inaudible and work in most of the commercially available devices the system 100 uses the frequency range from 16 kHz-20 KHz and a sampling frequency of 48 kHz, in one embodiment of the present disclosure.

Signal s(n) is generated such that it has a flat frequency response in the frequency spectrum and has random phase components in the phase spectrum. The phase for the transmitted signal is generated within [0-2π] using a known seed. Thus, the transmitted signal in discrete time domain could be obtained by performing Inverse Discrete Fourier Transformation (IDFT) on this flat frequency spectrum having random phase components. The resultant equation is shown below.

$$s(n) = \frac{1}{N} \sum_{k=0}^{k=N-1} e^{j\left(\frac{2\pi nk}{N} + \phi_k\right)} \quad (1)$$

N=the total number of samples
k=frequency index
$\phi_k$=random phase component

Figure 5:
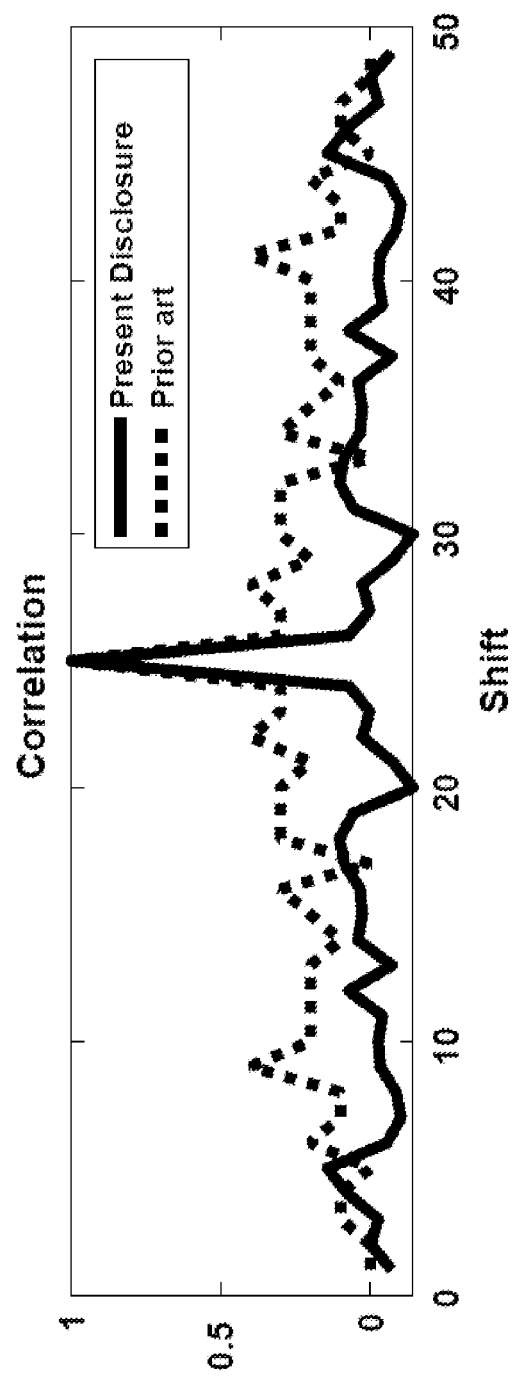
FIG. 5 depicts a graphical representation illustrating an auto correlation property of the band limited random waveform generated by the systems of FIGS. 1 through 3, as compared to GSM sequence used in conventional method, in accordance with an embodiment of the present disclosure.

In the experiments being performed by the present disclosure, the system and method considered the length of s(n) as 51 symbols. The signal s(n) is interpolated by 12 times to reduce the bandwidth of the signal to within 4 kHz (e.g., this frequency being the pre-defined threshold frequency). Further, to avoid the inter frame interference, the system appends the frame with zeros such that the total length of the signal is of duration 20 milliseconds (960 samples). The interpolated and zero padded signal x(n) is then modulated with a center frequency $f_c$ of 18 kHz by multiplying √2cos 2π$f_c$t. Further the modulated signal is passed to a band-pass filter to pass the frequencies in the range from 16 kHz to 20 KHz. This frame of signal is then looped and transmitted using the speaker (e.g., the waveform transmitter) wherein the transmitted signal serves as a filtered signal having the band limited random waveform as depicted in FIG. 2. In FIG. 5, it can be seen that for the same length the auto correlation property of the signal s(n) is better compared to the GSM sequence used for transmission in conventional work (prior art). More specifically, FIG. 5, with reference to FIGS. 1 through 4, depicts a graphical representation illustrating an auto correlation property of the band limited random waveform generated by the systems of FIGS. 1 through 3, as compared to GSM sequence used in conventional method, in accordance with an embodiment of the present disclosure.

Referring to steps of FIG. 4, at step 204 of the present disclosure, the one or more hardware processors 104 receive, via a plurality of microphones, a reflecting signal (e.g., a plurality of frames) from the user, in response to the transmitted filtered signal. While a single microphone is depicted in FIG. 3, it is to be understood by a person having ordinary skill in the art or person skilled in the art that more than 1 microphone can be utilized herein (e.g., 2 microphones used by the system and method of the present disclosure). Such use of 2 microphones and the arrangement described shall not be construed as limiting the scope of the present disclosure. The reflecting signal going from user to the microphones is shown in FIGS. 2 and 3 respectively.

At step 206 of the present disclosure, the one or more hardware processors 104 pre-process the reflecting signal to obtain a pre-processed signal comprising a real component and an imaginary component. In an embodiment, each of the transmitted filtered signal and the pre-processed signal comprise a plurality of frames. The plurality of frames comprised in the pre-processed signal may be referred as a plurality of pre-processed frames. The step of pre-processing the reflecting signal to obtain a pre-processed signal having a real component and an imaginary component comprises: (i) applying quadrature demodulation to the reflecting signal to obtain a demodulated signal, (ii) filtering the demodulated signal to obtain a low pass filter signal, and (iii) extracting the pre-processed signal having the real component and the imaginary component from the low pass filter signal. The above pre-processing steps of (i), (ii) an (iii) are performed by the pre-processing block as depicted in FIG. 2. The pre-processing of the reflecting signal can be better understood from FIG. 3. More specifically, once the reflecting signal is received, the system 100 applies quadrature demodulation to the received signal (reflecting signal) by multiplying with $\sqrt{2}\cos 2\pi f_c t$ and $-\sqrt{2}\sin 2\pi f_c t$ as depicted in FIG. 3. The demodulated signal is further passed through a low pass filter to extract the real and imaginary components of the received baseband signal y(n) (also referred as Y[n] and interchangeably used herein) as shown in FIG. 3.

At step 208 of the present disclosure, the one or more hardware processors 104 perform an autocorrelation of the transmitted filtered signal to obtain an autocorrelated signal. The autocorrelation is performed on the transmitted filtered signal by way of following expression/equation:

$$R_{xx}(\tau) = \sum_{n=1}^{N_s} x(n)x(n+\tau)$$

Since the signal x(n) is a periodic signal, this $R_{xx}(\tau)$ does not require computation for every frame, instead it can be computed once and stored (e.g., stored in the memory 102).

At step 210 of the present disclosure, the one or more hardware processors 104 apply a windowed filter on the autocorrelated signal to obtain a windowed autocorrelation output (also referred as windowed autocorrelation signal and interchangeably used herein). Width of the windowed filter is based on width of a highest autocorrelated lobe amongst a plurality of autocorrelated lobes comprised in the autocorrelated signal. The step of applying the windowed filter (also referred as windowed auto correlation filter) on the autocorrelated signal is better understood by way of following description:

Although, the above correlation equation is expected to provide a peak corresponding to the delay and should be near zero elsewhere, but due to the bandlimited nature of the signal x(n), the peak gets widened and at other regions it does not go to near zero. Thus, it is passed through a windowed filter which retains the peak while making the other regions zero. Let $w(\tau)$ denote the window filter centered around $\tau=0$ having the width $N_w$, $N_w$ is chosen such that it is greater than the width of the main lobe amongst other lobes of the correlation filter. The windowed correlation filter application can be expressed as below:

Windowed auto correlation filter: $R_{w_{xx}}(\tau)=R_{xx}(\tau)w(\tau)$

At step 212 of the present disclosure, the one or more hardware processors 104 perform a cross correlation to every frame of the pre-processed signal comprising the real component and the imaginary component with reference to the transmitted filtered signal to obtain a cross correlated signal. At step 214 of the present disclosure, the one or more hardware processors 104 obtain a magnitude cross correlated signal based on the cross correlated signal and a corresponding associated conjugate. The steps 210 and 212 are better understood by way of following description.

As mentioned above, let x(n) be the filtered signal having the band limited random waveform of length $N_s$. At the transmitter, this signal is periodically transmitted and let the transmitted signal at $l^{th}$ frame be $x_l(n)$, and the received signal (or pre-processed signal) corresponding to this $l^{th}$ frame:

$$y_l(n) = \sum_{k=1}^{L_s} a_k x_l(n - \tau_k) + a_d x_l\left(n - \tau_d^{(l)}\right) \quad (3)$$

where $L_s$ denotes the number of static reflections, for any $1 \le k \le L_s$, $\tau_k$ and $a_k$ denote the delay and attenuation factor of the kth static reflection component, and $a_d$ and $\tau_d$ denote the delay and attenuation factor of the dynamic reflection component (e.g., dynamic reflection component refers to finger motion), respectively.

The received/pre-processed signal ($y_l(n)$ or y(n)) is correlated with x(n) using the following:

$$R_{xy}^{(l)}(\tau) = \sum_{n=1}^{N_s} x(n) y_l(n+\tau)$$

This shall be computed for every received frame. Using $R_{xx}(\tau)$ and (3), the above equation can be expressed as:

$$R_{xy}^{(l)}(\tau) = \sum_{k=1}^{L_s} a_k R_{xx}(\tau - \tau_k) + a_d R_{xx}\left(\tau - \tau_d^{(l)}\right) \quad (4)$$

The correlation $R_{xx}(\tau-\tau_k)$ shall remain same across all frames since these correspond to reflection from static environment, while $R_{xx}(\tau-\tau_d^{(l)})$ is from the finger motion and keeps changing based on the finger motion.

Referring to steps of FIG. 4, at step 216 of the present disclosure, the one or more hardware processors 104 estimate a difference for every consecutive frame of the magnitude cross correlated signal. The difference in the cross correlation between the consecutive frames are taken which can be expressed as:

$$R_{xy_d}^{(l,l+1)}(\tau)=R_{xy}^{(l+1)}(\tau)-R_{xy}^{(l)}(\tau)=a_d(R_{xx}(\tau-\tau_d^{(l+1)})-R_{xx}(\tau-\tau_d^{(l)})) \quad (5)$$

The difference cross correlation removes reflections from all static background and shall only depend upon the motion of the finger. Only when this value is above a certain threshold, the further steps are executed to estimate the fine delay $\tau_d$.

At step 218 of the present disclosure, the one or more hardware processors 104 apply a shifted windowed filter on the difference based on a comparison between the difference and a pre-defined threshold to obtain a windowed difference magnitude cross correlation output (also referred as windowed difference magnitude cross correlation signal and interchangeably used herein). The windowed difference magnitude cross correlation output (or windowed difference magnitude cross correlation signal) is further based on a range of distance of the user from the plurality of microphones, in one embodiment of the present disclosure. The shifted windowed filter applied on the difference based on a comparison between the difference and a pre-defined threshold to obtain the windowed difference magnitude cross correlation output is expressed by way of following equation:

Shifted Windowed Filter (or Windowed Difference Cross Correlation Filter):

$$R_{wxy_d}^{(l,l+1)}(\tau)=R_{xy_d}^{(l,l+1)}(\tau)w(\tau-\tau_d(l))$$

The above step of 216 is better understood by way of following description:

To reduce the processing requirement, the system 100 detects if/whether the signal received (e.g., the reflecting signal) by the microphone is due to finger motion or not. Consider a case where the subject/user is moving the finger in front of the microphone. Similar to research work (e.g., W. Ruan, Q. Z. Sheng, L. Yang, T. Gu, P. Xu, and L. Shangguan\Audio-gest: enabling fine-grained hand gesture detection by decoding echo signal," in Proceedings of the 2016 ACM international joint conference on pervasive and ubiquitous computing, 2016, pp. 474-485, in order to decouple the finger motion and track seamlessly a magnitude cross correlation of the transmitted (e.g., the transmitted filtered signal) and the received/reflected signal (or the pre-processed signal having the real and imaginary component) is performed wherein the peaks corresponds to the various reflections of the transmitted signal captured by the microphone.

FIG. 6A shows the peaks obtained in $R_{xy}^{(l)}(\tau)$ with respect to two consecutive time instances. The peaks in $R_{xy}^{(l)}(\tau)$ may be due to static reflections, direct component from speaker, reflection from finger motion or other multi path components. More specifically, FIG. 6A, with reference to FIGS. 1 through 5, depicts a graphical representation illustrating peaks obtained with reference to consecutive time instances (consecutive frames) of the pre-processed signal comprising the real component and the imaginary component with reference to the transmitted filtered signal, in accordance with an embodiment of the present disclosure. In order to remove all the other reflection components and focus on the reflection from finger motion the system perform two steps: 1) subtracts consecutive correlation profiles to highlight the peak corresponding to finger motion and 2) determines the distance of this highlighted peak with respect to the main peak in $R_{xy}^{(l)}(\tau)$ which is the direct component from speaker. FIG. 6B shows the highlighted peak after subtraction and the corresponding distance from the main peak is denoted as $D_1$. More specifically, FIG. 6B, with reference to FIGS. 1 through 6A, depicts a graphical representation illustrating a highlighted peak after subtraction ($R_{xy_d}^{(l,l+1)}(\tau)$) and a corresponding distance from the main peak, in accordance with an embodiment of the present disclosure. The system 100 further processes the received signal for fine delay estimation only if the peak after subtraction is above a predefined threshold and the $D_1$ is within the range expected for finger motion. Applying windowed filter(s) provides two key benefits: 1) The unwanted side lobes appear as noise in the delay estimation, by windowing this unwanted signal shall be removed, and 2) In addition to tracking the motion of the finger, there may be other unwanted motion objects at different range, this windowing helps in removing these unwanted motions.

Once the windowed autocorrelation output and the windowed difference magnitude cross correlation output are obtained, the delay (also referred as fine delay and interchangeably used herein). In other words, at step 220 of the present disclosure, the one or more hardware processors 104 compute a delay corresponding to each of the plurality of microphones based on the windowed autocorrelation output and the windowed difference magnitude cross correlation output. In an embodiment of the present disclosure, the system and method apply Fast Fourier Transformation (FFT) on the windowed autocorrelation output and the windowed difference magnitude cross correlation output to obtain the delay. The step of computing the delay (or fine delay) may be better understood by way of following description:

As mentioned above, the windowed autocorrelation output and the windowed difference magnitude cross correlation output are transformed into the frequency domain by taking FFT, which can be expressed as:

$$F\{R_{w_{xx}}(\tau)\}=R_{w_{xx}}(f)$$

$$F\{R_{w_{xy_d}}^{(l,l+1)}(\tau)\}=R_{w_{xy_d}}^{(l,l+1)}(f)=a_d R_{w_{xx}}(f)e^{-j2\pi f\tau_d}$$

Now the following is computed:

$$\mathcal{R}_{\tau_d} = \frac{R_{w_{xy_d}}^{(l,l+1)}(f)}{R_{w_{xx}}(f)} = a_d e^{-j2\pi f\tau_d}$$

Figure 7A:
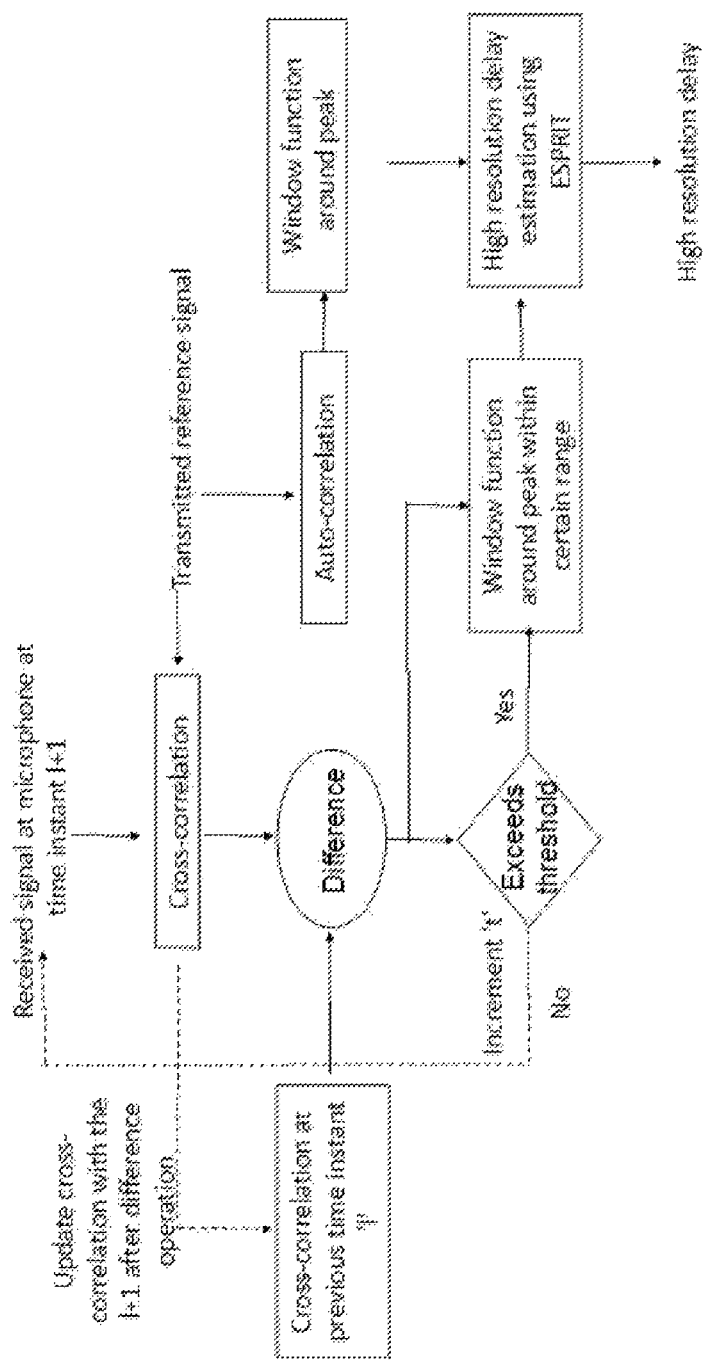
FIGS. 7A and 7B depict a flow-chart illustrating a method for estimating the delay based on the windowed autocorrelation output and the windowed difference magnitude cross correlation output generated by the systems of FIGS. 1 through 3, in accordance with an embodiment of the present disclosure.
Figure 7B:
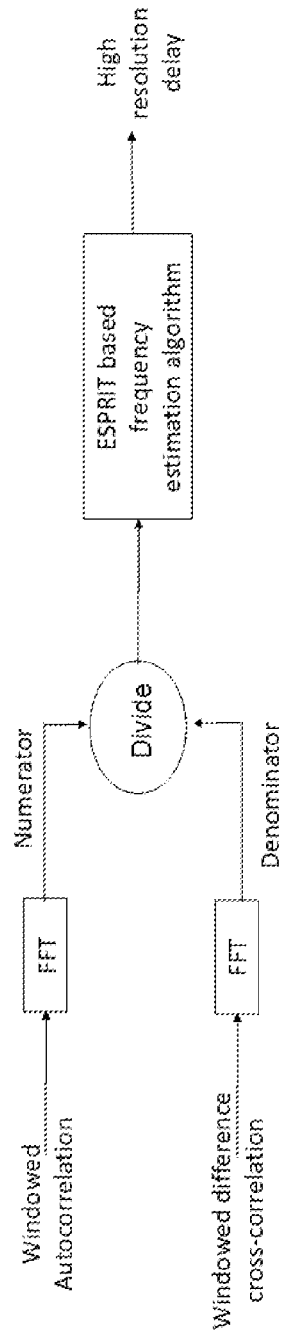

In the above expression, the frequency index $f=2(\pi/N)k$, $k=0, 1, 2, \ldots N-1$ where N denotes the FFT length. It is noticed from the above expression that the delay estimation problem has been converted to the complex frequency estimation problem and hence super-resolution methods such as Estimation of Signal Parameters via Rotational Invariant Techniques (ESPRIT) is used by the system and method of the present disclosure to compute the fine delay from the above expression. FIGS. 7A and 7B, with reference to FIGS. 1 through 6B, depict a flow-chart illustrating a method for estimating the delay based on the windowed autocorrelation output and the windowed difference magnitude cross correlation output generated by the systems of FIGS. 1 through 3, in accordance with an embodiment of the present disclosure.

Figure 8:
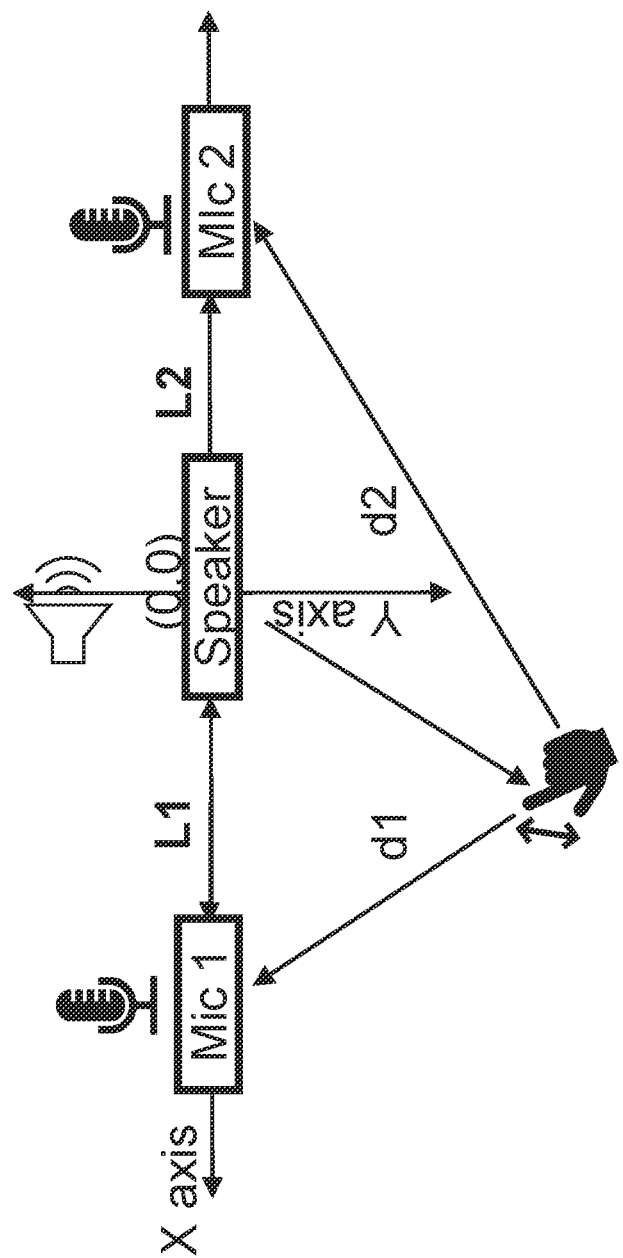
FIG. 8 depicts a multi-coordinate position of finger mapping with the computed delay, in accordance with an embodiment of the present disclosure.
Figure 9:
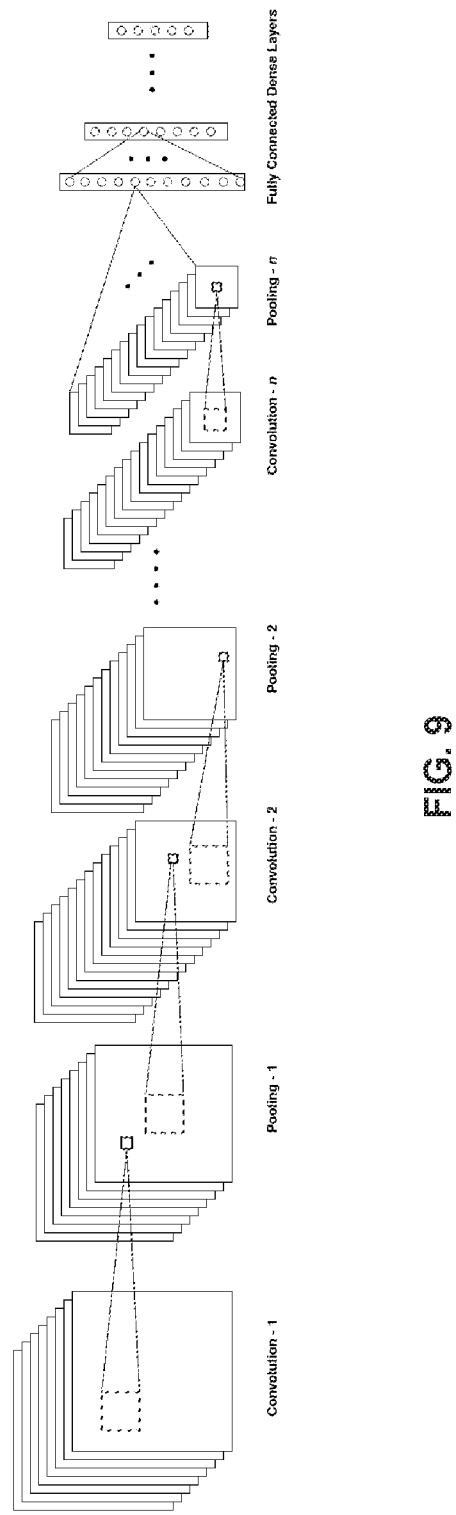
FIG. 9 illustrates a Convolution Neural Network (CNN) architecture with various layers as implemented by the systems of FIGS. 1 through 3, in accordance with an embodiment of the present disclosure.

Referring to steps of FIG. 4, at step 222 of the present disclosure, the one or more hardware processors 104 track a plurality of multi-coordinate finger positions based on (i) the computed delay corresponding to each of the plurality of microphones and (ii) a common intersection between one or more ellipses formed with the plurality of microphones and the waveform transmitter using the computed delay. The above step of 222 track the plurality of multi-coordinate finger positions may be better understood by way of following description:

Distance $d_1$ and $d_2$ measured by the microphones corresponds to the sum of the path from speaker to finger and finger to microphone. These estimates are further used to estimate the multi-coordinate position of finger with respect to a predefined setup as shown in FIG. 8. More specifically, FIG. 8, with reference to FIGS. 1 through 7B, depicts a multi-coordinate position of finger mapping with the computed delay, in accordance with an embodiment of the present disclosure. Here Mic1, Mic2 represent the two microphones with a small speaker placed at the center and $M_1$, $M_2$ denote the distance between the speaker and microphone. The position of the finger is such that the speaker/waveform transmitter and microphone are the two foci of the ellipse and the measured distance ($d_1$ or $d_2$) is twice the length of major axis. The equation of these ellipses can be mathematically written/expressed as:

$$\frac{4x^2}{d_1^2 - M_1^2} + \frac{4(y-M_1)^2}{d_1^2} = 1$$

$$\frac{4x^2}{d_2^2 - M_2^2} + \frac{4(y-M_2)^2}{d_2^2} = 1$$

By finding the intersection of these two ellipses the system can narrow down the position of the finger in multi-coordinate. The x, y coordinates of the finger motion can be calculated using:

$$x = \frac{\sqrt{(d_1^2 - M_1^2)(d_2^2 - M_2^2)((M_1 + M_2)^2 - (d_1 - d_2)^2)}}{2(d_1 L_2 + d_2 L_1)}$$

$$y = \frac{d_2 M_1^2 - d_1 M_2^2 - d_1^2 d_2 + d_2^2 d_1}{2(d_1 M_2 + d_2 M_1)}$$

Once the plurality of multi-coordinate finger positions is tracked, at step 224 of the present disclosure, the one or more hardware processors 104 recognize, via a Spike Neural Network (SNN), a gesture performed by the user based on the plurality of multi-coordinate finger positions.

Deep input data in the form of tracked multi-coordinates from the signal processing pipeline needs to be pre-processed using a set of techniques such as coordinate to image mapping, contour detection, orientation correction, rescaling and centering, and the like. All these techniques enable tracked output to be processed as a standardized images using neural networks. Once these image representations are formed from the tracked data (e.g., the plurality of multi-coordinate finger positions), these can be processed using SNN either by:

a) Carrying out the hierarchical representation learning using an artificial network architecture capable of learning from images (such as a Convolution Neural Network—CNN) and then converting that training into that of a new spiking neural network. In this method, images need to be encoded into spiking domain during testing phase only. This is because training phase is done on CNN like networks which can work on real-valued data.

b) Using a feed-forward spiking neural network directly to learn the required representations directly using learning mechanisms like Spike—Time-Dependent Plasticity (STDP). In this approach, images need to be encoded into spike domain during training and testing phases. The learning is carried out by an SNN itself, rather than by using a CNN intermediary.

For both approaches data augmentation needs to be carried out to reduce dependency on data to learn various invariances. Once data augmentation is carried out, a CNN network as shown in the FIG. 9 (or a native feed forward SNN depending on method) is trained on the transformed data. More specifically, FIG. 9, with reference to FIGS. 1 through 8, illustrates a Convolution Neural Network (CNN) architecture with various layers as implemented by the systems of FIGS. 1 through 3, in accordance with an embodiment of the present disclosure.

For the above method a), training is carried out using gradient based approaches such as gradient descent and backpropagation. The trained model is quantized into a smaller network, which requires less memory and then converted into a new SNN layer by layer. This converted SNN can apply convolutions on spike trains. For inference/testing, input to this converted SNN is encoded using an appropriate spike encoding technique like Poisson encoding and based on the output of the converted SNN, gesture output is determined.

For the above-mentioned method (b), a feed-forward spiking neural network is used. It can be connected in a convolutional fashion or using full connectivity/dense connectivity according to the application. Input images to the network are then encoded into m-dimensional (value of m is 1, 2, . . . , n) spike trains and a local learning rule like Spike-timing-dependent plasticity (STDP) can be used to learn the weights for the SNN. Once training is done, the network detects gestures in spike domain.

Referring to step 222, the spike neural network is obtained by training a Convolutional Neural Network (CNN) using training data comprising a plurality of multi-coordinate mapped finger positions corresponding to one or more users to obtain a trained CNN; quantizing the trained CNN to obtain a quantized CNN; and converting the quantized CNN to the SNN. The above step of training the CNN is better understood by way of following description:

The spatial structure of every gesture in the multi-coordinate space can be captured by using a feed-forward Conrelvolutional Neural Network (CNN). A CNN is an artificial neural network (ANN) which tries to loosely model the visual cortex of the brain. It is an efficient mathematical model for learning to represent hierarchical features for spatially rich data like images. For this purpose, the system 100 converts multi-coordinate space representation (e.g., or multi-coordinate finger positions) into an image and processes it using an experimentally designed CNN architecture as shown in the FIG. 9. The details of the CNN architecture are as follows:

1. Learnable convolutional filter layers are alternated with pooling layers. These can be from 1 to any arbitrary n.
2. Both convolutional and pooling operations are done on windows (as shown by dotted rectangles in image) of arbitrary sizes. These can be chosen according to application/data at hand. For each layer these can be represented as (Ch_1, Cw_1) denoting height and width used on convolutional layer 1. Similarly for pooling these can be (Ph_1, Pw_1). These can also run from layer 1 to n.
3. After n-th convolution and pooling blocks, k-different fully connected dense layers with SoftMax at the last (k-th) layer gives the gesture probability.

This network as designed and implemented by the system and method of the present disclosure once trained, extracts relevant features of tracked multi-coordinate gestures represented as images. This CNN comprises of multi-dimensional convolutional layers which learn relevant filters from the data, max-pooling layers which sample the features among the neighbourhood to impart some generalization and dense classification layers which provide probabilities and are fully connected. Convolutional layers use ReLU (rectified linear unit) activation function, whereas dense layers use both ReLU and SoftMax functions. To Improve the generalization of the CNN for gesture recognition task, some amount of dropout is used by the system 100 during training. To make these feature extraction more efficient and effective certain pre-processing steps are applied as applicable which increases the accuracy of the detection. These involve applying affine transformations after a contour detection, such as centering, orientation correction, rescaling, and other data augmentation strategies/technique(s). The CNN is only used as an intermediate model before the learning is transferred to a similar convolutional spiking neural network. The above step of quantizing the trained CNN to obtain a quantized CNN is better understood by way of following description:

Once the CNN network is trained and fixed, it needs to be converted for an edge device. This process is two-fold: 1) reduce the memory footprint of the model (Quantization), and 2) Reduce the computational/power requirements of the model (SNN Conversion). Memory footprint reduction is carried out through parameter quantization. In this approach, trained weight matrices are converted to reduced data formats requiring a smaller number of bits to be represented. The parameters lose some amount of precision during this approach, but drastically reduces the model size. In the present disclosure and its method, the CNN trained weights are converted from 32-bit floating point values to 8-bit integer values. This is achieved using a binning algorithm (comprised in the memory 102) which maps values in a particular range do 255 possible values which an 8-bit integer can support. An additional step of post-quantization training is also carried out, to re-capture some of the loss in accuracy. The above step of converting the quantized CNN to the SNN is better understood by way of following description:

As known a CNN is a computationally heavy model for running on power constrained devices such as mobile phones, tablets, laptops, etc. This can be mitigated by using the asynchronous low power computing of spiking neural networks. For converting the above shown CNN to the SNN, a conversion method is employed using a process outlined below:

1. For each CNN neuron with ReLU activation, a Leaky integrate and fire (LIF) neuron is constructed so as to match the continuous activations of the ReLU function with a spike rate function.
2. The maximum ReLU activation for each layer is captured and the learned parameters (weights (w) and biases (b)) of the CNN are normalized on a layer-by-layer basis for the converted network as shown in the below equations:

$$w^l = w^l \frac{\lambda^{l-1}}{\lambda^l} \text{ and } b^l = \frac{b^l}{\lambda^l}$$

3. Each bias term of the CNN neuron is converted to a spike stream of constant rate spike train of appropriate polarity and is connected to the corresponding SNN neuron.
4. Pooling layers are converted by applying a localized winner-take-all mechanism between SNN neurons in the pooling window.
5. The output layer is replaced by an integrate neuron layer.
6. Outputs from integrate neuron layer is passed through a Softmax function to obtain the corresponding class gesture probability.

Figure 10:
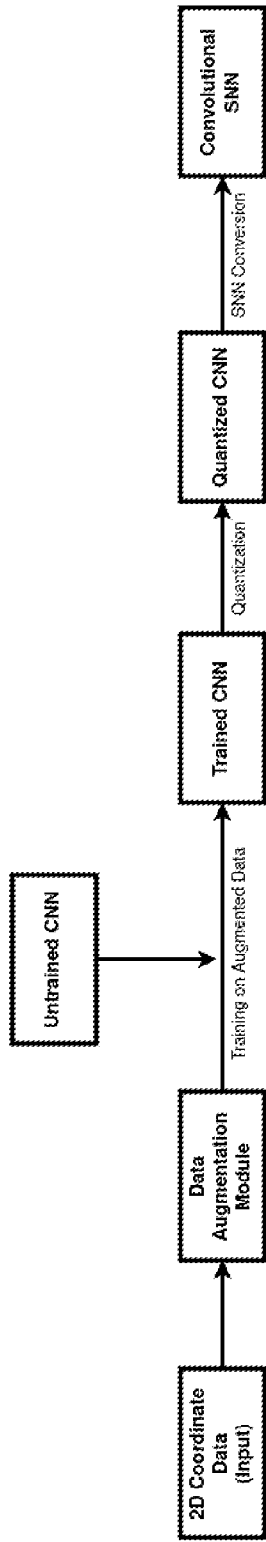
FIG. 10 depicts a block diagram illustrating a conversion of a Convolution Neural Network to a Spike Neural Network as implemented by the systems of FIGS. 1 through 3, in accordance with an embodiment of the present disclosure.
Figure 11:
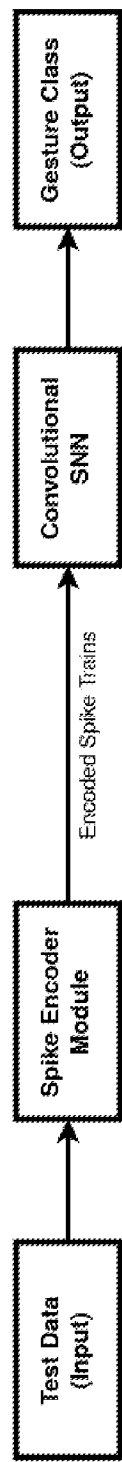
FIG. 11 depicts a block diagram illustrating recognition of gesture performed by a user, using the Spike Neural Network as implemented by the systems of FIGS. 1 through 3, in accordance with an embodiment of the present disclosure.

Once the conversion is done, a trimmed Convolutional Spiking Neural Network is obtained which works similar to the original CNN. This SNN can be then deployed on power constrained devices using a neuromorphic chip for power efficient gesture detection from acoustic signals. The above steps can be further better understood by way of a depiction shown in FIG. 10. More specifically, FIG. 10, with reference to FIGS. 1 through 9, depicts a block diagram illustrating a conversion of a Convolution Neural Network to a Spike Neural Network as implemented by the systems of FIGS. 1 through 3, in accordance with an embodiment of the present disclosure. In FIG. 10, the step of data augmentation can be better understood by way of following description:

Deep Neural Network based system require a lot of data in the training phase to learn all the hidden patterns in the dataset associated with a problem at hand. Since it is difficult to capture all the possibilities as separate datapoints and then train the system, one or more data augmentation techniques as known in the art are implemented by the system 100 of the present disclosure to enhance each multi-coordinate finger position mapping. These techniques help in learning various invariances related to data like translation invariance, scale invariance, orientation invariance, etc. Also, these techniques reduce the amount of data that needs to be collected for the gesture recognition task.

Data Augmentations employed during the training: Random Rotation Transformations within [0, 30 degrees] range, Random Shear Transformation within [0, 45 degrees] with respect to x-axis, Random Scaling Transformations within [80%, 120%] range.

Once the SNN (also referred as Convolution Spike Neural Network) is obtained, the SNN is used for recognizing, via a Spike Neural Network (SNN), a gesture performed by the user based on the plurality of multi-coordinate finger positions. The step of recognizing, via the Spike Neural Network (SNN), a gesture performed by the user based on the plurality of multi-coordinate finger positions comprises converting the plurality of multi-coordinate finger positions to a spike-domain; extracting, one or more features of the spike-domain using one or more spiking neurons comprised in the SNN; and recognizing the gesture of the figure from the extracted one or more features by using the SNN.

The step of converting the plurality of multi-coordinate finger positions to a spike-domain is better understood by way of following description:

As mentioned above, the multi-coordinate finger positions are first pre-processed into intermediated image representations which are then converted to spike trains (on spiking domain) using an encoding technique. Details of pre-processing are described above.

Input data in the form of continuous real values cannot be processed directly by a spiking neural network. A spiking neural network needs data in the form of events distributed in time called spike trains. The process of conversion of continuous real valued data into spike trains is called Spike encoding. There are many existing ways to do this in literature. Most approaches stem from mimicking the way brain encodes real world stimulus to neural responses. From this, the system and method of the present disclosure have chosen a relevant spike encoding scheme for the end-to-end gesture recognition. The details are provided below by way of non-construing illustrative examples:

Poisson Spike Encoding (or Poisson encoding): Poisson Encoding is a rate based encoding techniques with the core philosophy that firing rate of a neuron solely determines the computational activity of a neuron. This spike encoding is chosen by the system and method of the present disclosure for the following reasons:

1. The system 100 of FIGS. 1 through 3 is focused on converting the training of artificial neural networks (or also referred CNN) into spiking neural networks. ANN based neurons are in fact equivalent to rate-based spike encoding. Continuous value outputs from ANN can be interpreted as the rate of the spiking neuron to which are converted by the present disclosure. As such an encoding scheme based on rate of the neural firing is suitable.
2. It is computationally efficient and more versatile as the simulation time can be easily controlled by the system 100.
3. Neural Spiking in the cortex region, which the system 100 is modelling using CNN has been shown to generate spikes which are distributed according to Poisson encoding.

For a Poisson process, the probability of observing exactly n spikes in a time interval $(t_1, t_2)$ is given by:

$$P(n \text{ spike during } (t_1, t_2)) = e^{(\langle n \rangle)} \frac{|n|^n}{n!}$$

where the average spike count <n> is expressed as:

$$\langle n \rangle = \int_{t_1}^{t_2} r(t) dt$$

r(t) is the instantaneous firing rate. With slow variation of r(t) in small time sub-interval δt, r(t) can be assumed with discrete rate value r[i]. With the approximation of a Poisson process by infinitely many Bernoulli trials and each Bernoulli trial by a uniform draw x[i] at each time step i, a spike can be denoted as:

T[i]=1 if x[i]<r[i]δt and T[i]=0 if x[i]≥r[i]δt.

The step of extracting, one or more features of the spike-domain using one or more spiking neurons comprised in the SNN is better understood by way of following description:

Features are extracted in the spike domain using convolutional filters learnt while CNN model is trained. These CNN weights are converted to convolutional filters capable of extracting relevant features.

The step of recognizing the gesture of the figure from the extracted one or more features by using the SNN is better understood by way of following description:

Gesture is recognized based on the spike activity of final neuron in the output layer. Since the converted SNN is recognizes relevant features, on the final output layer, a softmax function applied on the output layer directly translates to gesture probabilities. Gesture with highest probability is chosen as the recognized gesture. In other words, once the conversion has happened and a convolutionally connected SNN is obtained, which is trained indirectly, the spike trains obtained can be connected using spike encoding to its input layer. The spike-trains are processed accordingly and in the final layer, the gesture class neurons output is fed into a SoftMax function to obtain the gesture probabilities. Gesture class with the highest probability is selected as the recognized gesture and is outputted. The above steps of converting, extracting the features, and recognizing the gesture performed by a user can be further better understood by way of a depiction shown in FIG. 11. More specifically, FIG. 11, with reference to FIGS. 1 through 10, depicts a block diagram illustrating recognition of gesture performed by a user, using the Spike Neural Network as implemented by the systems of FIGS. 1 through 3, in accordance with an embodiment of the present disclosure.

Various experiments were conducted on the CNN conversion to SNN for gesture recognition and the final results are shown in below Table 1:

TABLE 1

| Dataset | CNN | Quantized CNN | SNN (or C-SNN) |
| --- | --- | --- | --- |
| Dataset comprised of gestured performed by user (representing numbers) collected by system and method of the present disclosure | 88.00% | 92.00% | 92.00% |

Experimental Evaluation:

The present disclosure and its methods conducted detailed experiments to validate the feasibility of the system. Data was collected using commercially available laptop stereo microphones with a small speaker placed in center as shown in FIG. 7A. In order to compare the tracking accuracy of the gesture recognition by the system with respect to conventional method, the system performed experiments by collecting data from 5 subjects and validating the tracking/recognition accuracy. The subjects/user were asked to place the finger at a distance of 20 cm and move towards it by 10 cm. This experiment was repeated 40 times for each subject/user generating a total of 200 sets. The relative distance tracking for prior art/convention method was implemented. The initial distance algorithm was not implemented since here the subject was asked to start from an initial distance of 20 cm.

Figure 12:
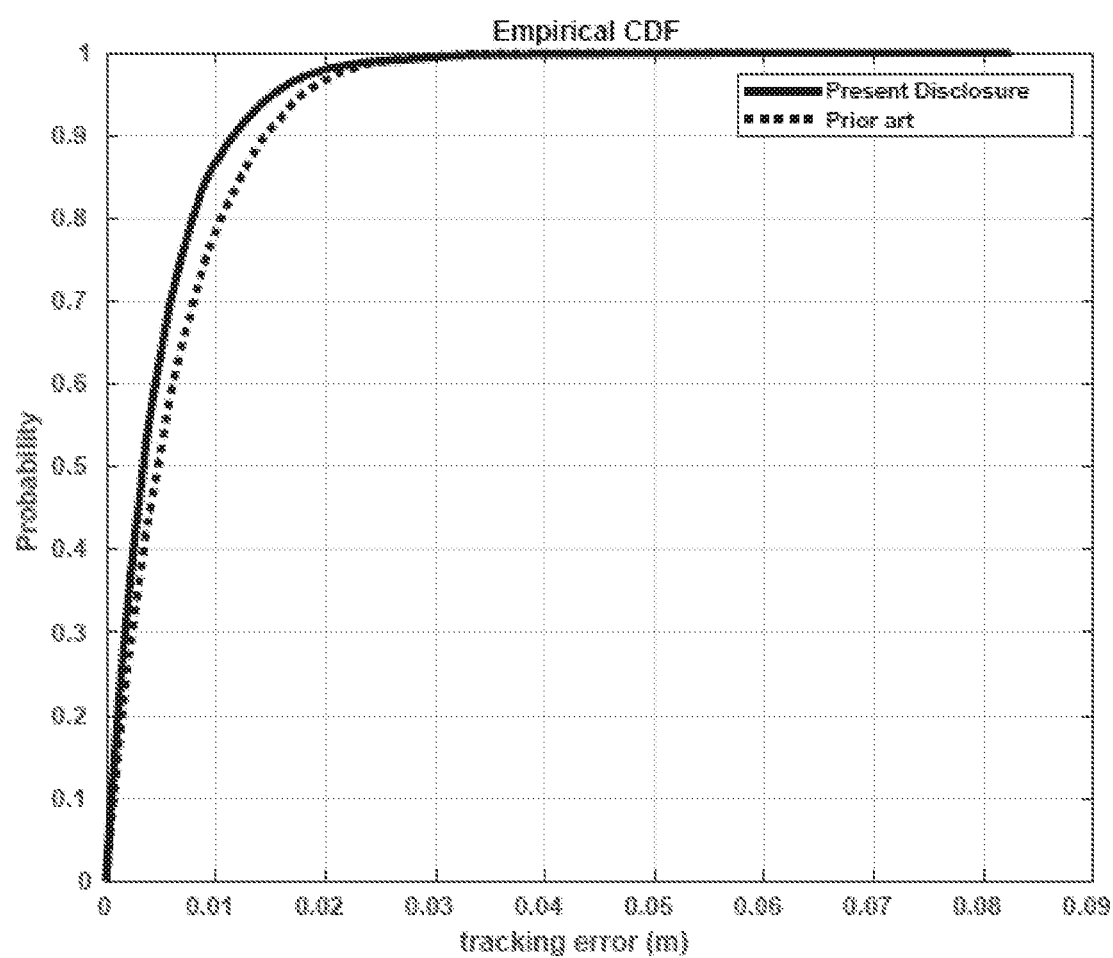
FIG. 12 depicts a graphical representation illustrating Cumulative Distribution Function (CDF) of tracking error for dataset collected for method of the present disclosure and conventional approach/method, in accordance with an embodiment of the present disclosure.

To compare the tracking accuracy for the delay estimation, the same band-limited random waveform was used as the transmit waveform and the same received data was fed to both the system and prior art (e.g., refer "S. Yun, Y.-C. Chen, H. Zheng, L. Qiu, and W. Mao, Strata: Fine-grained acoustic-based device-free tracking," in Proceedings of the 15th annual international conference on mobile systems, applications, and services, 2017, pp. 15-28."). The Cumulative Distribution Function (CDF) plot of the tracking error for the dataset collected for both the approaches is shown in FIG. 12. More specifically, FIG. 12, with reference to FIGS. 1 through 11, depicts a graphical representation illustrating Cumulative Distribution Function (CDF) of tracking error for dataset collected for method of the present disclosure and conventional approach/method, in accordance with an embodiment of the present disclosure. As observed the median tracking accuracy for the method described herein by the present disclosure is 3.31 mm compared to conventional approach having 4.69 mm and 90 percentile error is less than 1.1 cm for the method of the present disclosure as compared to 1.44 cm for conventional approach. Conventional approach used least square based approximation for channel estimation where noise is not taken into consideration. The median accuracy mentioned in conventional approach in the presence of noise is around 4 mm and is line with observations of the present disclosure.

Figure 13A:
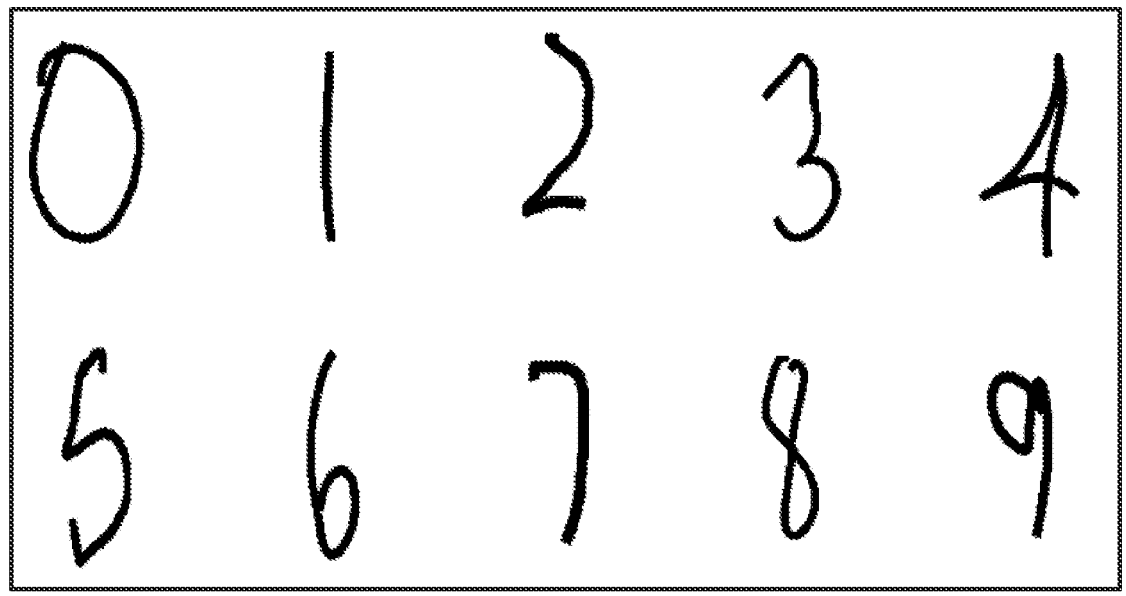
FIGS. 13A and 13B depict output plotted for recognized gestures for numbers and shapes, in accordance with an embodiment of the present disclosure.
Figure 13B:
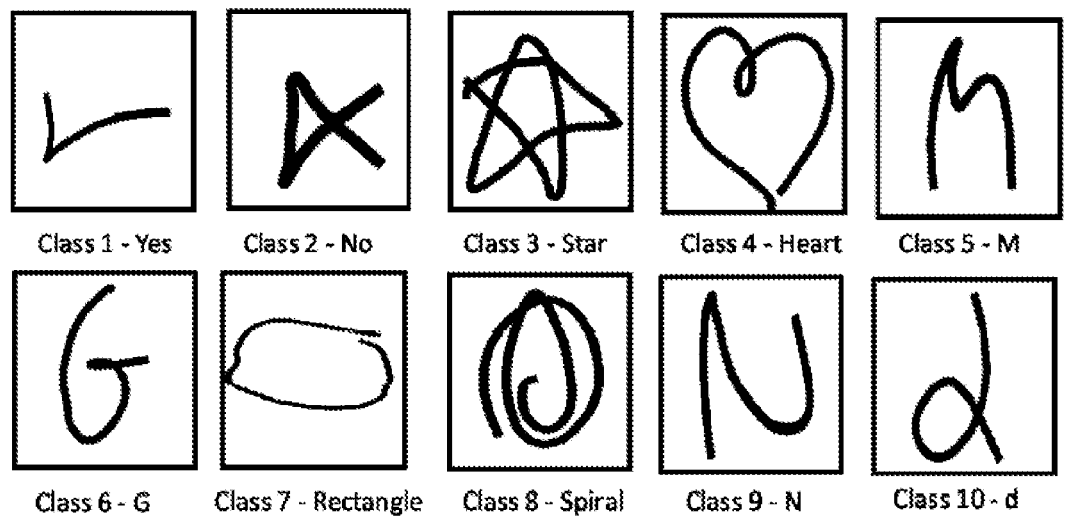
Figure 14:
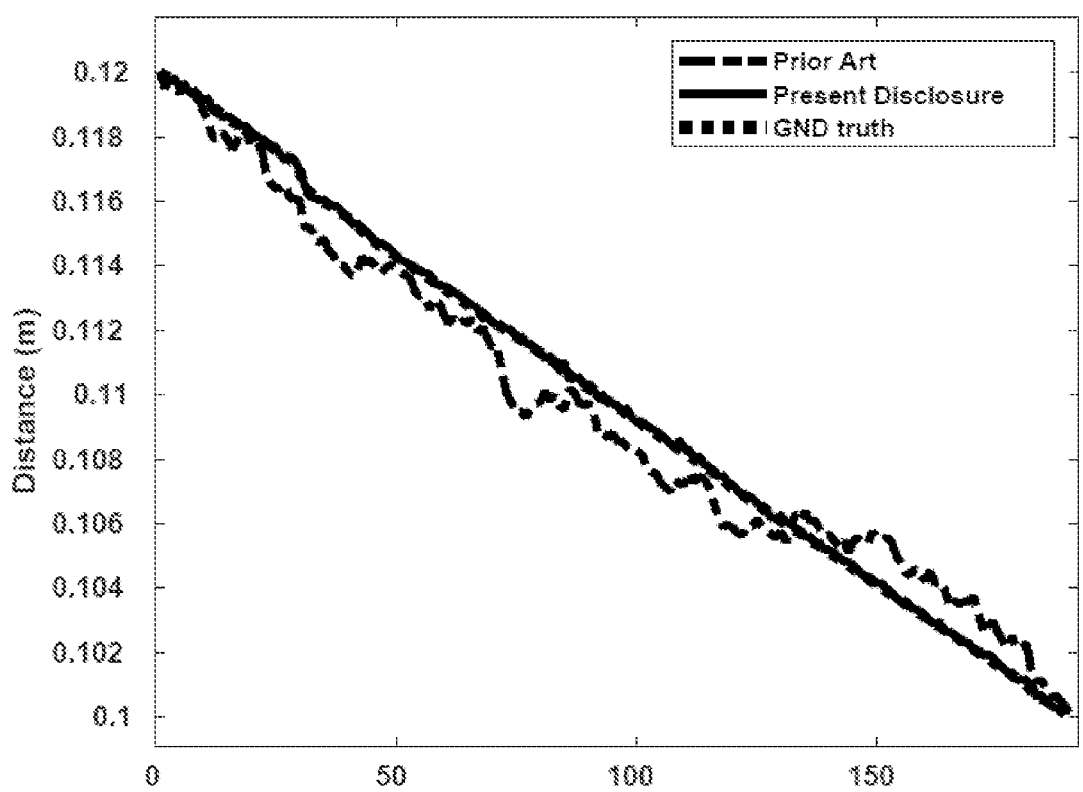
FIG. 14 depicts simulation results of the method of the present disclosure being compared with conventional method with respect to ground truth, in accordance with an embodiment of the present disclosure.

The system and method further evaluated the task of gesture detection/recognition using spiking neural network by collecting data for different tracked multi-coordinate numbers and shapes. This dataset was used for training purposes and the tracked gestured was used as testing results. A sample output plotted for the tracked gestured for numbers and shapes is shown in FIGS. 13A and 13B respectively. More specifically, FIGS. 13A and 13B, with reference to FIGS. 1 through 12, depict output plotted for recognized gestures for numbers (refer Table 1 for accuracy) and shapes, in accordance with an embodiment of the present disclosure. FIG. 14, with reference to FIGS. 1 through 13B, depicts simulation results of the method of the present disclosure being compared with conventional method with respect to ground truth, in accordance with an embodiment of the present disclosure. To clearly highlight the effect in mm (millimeter) level tracking, the system 100 simulated as if there is a reflection of finger that is moving from 10 cm to 12 cm in the presence of gaussian noise. As observed with respect ground truth the method of the present disclosure for delay estimation correctly tracks the ground truth even in the presence of noise compared to prior art approach. It is to be further understood by a person having ordinary skill in the art or person skilled in the art that though the embodiments of the present disclosure, its system and method described herein refer to transmitting filtered signal to user(s) and receiving reflecting signals in response to the transmitting filtered signal with band limited random waveform, such examples shall not be construed as limiting the scope of the present disclosure to gesture recognition of user(s) only. In other words, the filtered signal with band limited random waveform may be transmitted to non-human user(s) (e.g., (i) devices or smart devices such as machines, robot/robotic arm(s), living beings other than user(s)) wherein such devices/non-human user(s) are capable of receiving/recognizing the transmitted filtered signal and transmitting reflecting signal(s) in response to the filtered signal with band limited random waveform being received.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    transmitting, via a waveform transmitter, a filtered signal having a band limited random waveform to a user;
    receiving, via a plurality of microphones, a reflecting signal from the user, in response to the transmitted filtered signal;
    pre-processing the reflecting signal to obtain a pre-processed signal having a real component and an imaginary component, wherein the pre-processed signal comprises a plurality of frames;
    performing an autocorrelation of the transmitted filtered signal to obtain an autocorrelated signal;
    applying a windowed filter on the autocorrelated signal to obtain a windowed autocorrelation output;
    performing a cross correlation for every frame of the plurality of frames of the pre-processed signal with reference to the transmitted filtered signal to obtain a cross correlated signal for every frame of the plurality of frames;
    estimating a difference in the cross correlated signal between consecutive frames of the pre-processed signal;
    applying a shifted windowed filter on the difference, when the difference is above a pre-defined threshold, to remove unwanted signals and to obtain a windowed difference magnitude cross correlation output;
    computing a delay corresponding to each of the plurality of microphones by applying a Fast Fourier Transformation on the windowed autocorrelation output and the windowed difference magnitude cross correlation output;
    tracking a plurality of multi-coordinate finger position based on (i) the delay corresponding to each of the plurality of microphones and (ii) a common intersection between one or more ellipses formed with the plurality of microphones and the waveform transmitter using the delay; and recognizing, via a Spike Neural Network (SNN), a gesture performed by the user based on the plurality of multi-coordinate finger positions by:
- converting the plurality of multi-coordinate finger positions to a spike-domain;
- extracting, one or more features of the spike-domain using one or more spiking neurons comprised in the SNN; and
- recognizing the gesture performed by the user from the extracted one or more features by using the SNN, wherein the SNN is obtained by:
  - training a Convolutional Neural Network (CNN) using training data further comprising a plurality of multi-coordinate mapped finger positions corresponding to one or more users to obtain a trained CNN;
  - quantizing the trained CNN to obtain a quantized CNN; and
  - converting the quantized CNN to the SNN.

2. The processor implemented method of claim 1, wherein, the step of transmitting, via the waveform transmitter, the filtered signal having the band limited random waveform is preceded by:
- generating a transmitting signal;
- interpolating the generated transmitted signal to obtain an interpolated signal;
- appending one or more frames of the interpolated signal with zeros to obtain an interpolated and padded signal;
- modulating the interpolated and padded signal to obtain a modulated signal; and
- passing the modulated signal to a band pass filter to obtain the filtered signal.

3. The processor implemented method of claim 2, wherein the step interpolating the generated transmitted signal to obtain the interpolated signal is performed to reduce bandwidth of the transmitted filtered signal such that an associated frequency is within a pre-defined frequency threshold.

4. The processor implemented method of claim 1, wherein the step of pre-processing the reflecting signal to obtain the pre-processed signal having the real component and the imaginary component comprises:
- applying quadrature demodulation to the reflecting signal to obtain a demodulated signal;
- filtering the demodulated signal to obtain a low pass filter signal; and
- extracting the pre-processed signal having the real component and the imaginary component from the low pass filter signal.

5. The processor implemented method of claim 1, wherein width of the windowed filter is based on width of a highest autocorrelated lobe amongst a plurality of autocorrelated lobes comprised in the autocorrelated signal.

6. The processor implemented method of claim 1, wherein the windowed difference magnitude cross correlation output is further based on a range of distance of the user from the plurality of microphones.

7. A system, comprising:
- a memory storing instructions;
- one or more communication interfaces; and
- one or more hardware processors coupled to the memory via the one or more communication interfaces, wherein the one or more hardware processors are configured by the instructions to:
  - transmit, via a waveform transmitter, a filtered signal having a band limited random waveform to a user;
  - receive, via a plurality of microphones, a reflecting signal from the user, in response to the transmitted filtered signal;
  - pre-process the reflecting signal to obtain a pre-processed signal having a real component and an imaginary component, wherein the pre-processed signal comprises a plurality of frames;
  - perform an autocorrelation of the transmitted filtered signal to obtain an autocorrelated signal;
  - apply a windowed filter on the autocorrelated signal to obtain a windowed autocorrelation output;
  - perform a cross correlation for every frame of the plurality of frames of the pre-processed signal with reference to the transmitted filtered signal to obtain a cross correlated signal for every frame of the plurality of frames;
  - estimate a difference in the cross correlated signal between consecutive frames of the pre-processed signal;
  - apply a shifted windowed filter on the difference when the difference is above a pre-defined threshold, to remove unwanted signals and obtain a windowed difference magnitude cross correlation output;
  - compute a delay corresponding to each of the plurality of microphones by applying a Fast Fourier Transformation on the windowed autocorrelation output and the windowed difference magnitude cross correlation output;
  - track a plurality of multi-coordinate finger position based on (i) the delay corresponding to each of the plurality of microphones and (ii) a common intersection between one or more ellipses formed with the plurality of microphones and the waveform transmitter using the delay; and
  - recognize, via a Spike Neural Network (SNN), a gesture performed by the user based on the plurality of multi-coordinate finger positions by:
    - converting the plurality of multi-coordinate finger positions to a spike-domain;
    - extracting, one or more features of the spike-domain using one or more spiking neurons comprised in the SNN; and
    - recognizing the gesture performed by the user from the extracted one or more features by using the SNN, wherein the SNN is obtained by:
      - training a Convolutional Neural Network (CNN) using training data further comprising a plurality of multi-coordinate mapped finger positions corresponding to one or more users to obtain a trained CNN;
      - quantizing the trained CNN to obtain a quantized CNN; and
      - converting the quantized CNN to the SNN.

8. The system of claim 7, wherein the filtered signal having the band limited random waveform is obtained by:
- generating a transmitting signal;
- interpolating the generated transmitted signal to obtain an interpolated signal;
- appending one or more frames of the interpolated signal with zeros to obtain an interpolated and padded signal;
- modulating the interpolated and padded signal to obtain a modulated signal; and
- passing the modulated signal to a band pass filter to obtain the filtered signal.

9. The system of claim 8, wherein the step interpolating the generated transmitted signal to obtain an interpolated signal is performed to reduce bandwidth of the transmitted filtered signal such that an associated frequency is within a pre-defined frequency threshold.

10. The system of claim 7, wherein the pre-processed signal having the real component and the imaginary component is obtained by:
applying quadrature demodulation to the reflecting signal to obtain a demodulated signal;
filtering the demodulated signal to obtain a low pass filter signal; and
extracting the pre-processed signal having the real component and the imaginary component from the low pass filter signal.

11. The system of claim 7, wherein width of the windowed filter is based on width of a highest autocorrelated lobe amongst a plurality of autocorrelated lobes comprised in the autocorrelated signal.

12. The system of claim 7, wherein the windowed difference magnitude cross correlation output is further based on a range of distance of the user from the plurality of microphones.

13. One or more non-transitory machine-readable information storage mediums comprising one or more instructions which when executed by one or more hardware processors cause:
transmitting, via a waveform transmitter, a filtered signal having a band limited random waveform to a user;
receiving, via a plurality of microphones, a reflecting signal from the user, in response to the transmitted filtered signal;
pre-processing the reflecting signal to obtain a pre-processed signal having a real component and an imaginary component, wherein the pre-processed signal comprises a plurality of frames;
performing an autocorrelation of the transmitted filtered signal to obtain an autocorrelated signal;
applying a windowed filter on the autocorrelated signal to obtain a windowed autocorrelation output;
performing a cross correlation for every frame of the plurality of frames of the pre-processed signal with reference to the transmitted filtered signal to obtain a cross correlated signal for every frame of the plurality of frames;
estimating a difference in the cross correlated signal between consecutive frames of the pre-processed signal;
applying a shifted windowed filter on the difference, when the difference is above a pre-defined threshold, to remove unwanted signals and to obtain a windowed difference magnitude cross correlation output;
computing a delay corresponding to each of the plurality of microphones by applying a Fast Fourier Transformation on the windowed autocorrelation output and the windowed difference magnitude cross correlation output;
tracking a plurality of multi-coordinate finger position based on (i) the delay corresponding to each of the plurality of microphones and (ii) a common intersection between one or more ellipses formed with the plurality of microphones and the waveform transmitter using the delay; and recognizing, via a Spike Neural Network (SNN), a gesture performed by the user based on the plurality of multi-coordinate finger positions by:
converting the plurality of multi-coordinate finger positions to a spike-domain;
extracting, one or more features of the spike-domain using one or more spiking neurons comprised in the SNN; and
recognizing the gesture performed by the user from the extracted one or more features by using the SNN,
wherein the SNN is obtained by:
training a Convolutional Neural Network (CNN) using training data further comprising a plurality of multi-coordinate mapped finger positions corresponding to one or more users to obtain a trained CNN;
quantizing the trained CNN to obtain a quantized CNN; and
converting the quantized CNN to the SNN.

14. The one or more non-transitory machine-readable information storage mediums of claim 13, wherein, the step of transmitting, via the waveform transmitter, the filtered signal having the band limited random waveform is preceded by:
generating a transmitting signal;
interpolating the generated transmitted signal to obtain an interpolated signal;
appending one or more frames of the interpolated signal with zeros to obtain an interpolated and padded signal;
modulating the interpolated and padded signal to obtain a modulated signal; and
passing the modulated signal to a band pass filter to obtain the filtered signal.

15. The one or more non-transitory machine-readable information storage mediums of claim 14, wherein the step interpolating the generated transmitted signal to obtain the interpolated signal is performed to reduce bandwidth of the transmitted filtered signal such that an associated frequency is within a pre-defined frequency threshold.

16. The one or more non-transitory machine-readable information storage mediums of claim 13, wherein the step of pre-processing the reflecting signal to obtain the pre-processed signal having the real component and the imaginary component comprises:
applying quadrature demodulation to the reflecting signal to obtain a demodulated signal;
filtering the demodulated signal to obtain a low pass filter signal; and
extracting the pre-processed signal having the real component and the imaginary component from the low pass filter signal,
wherein width of the windowed filter is based on width of a highest autocorrelated lobe amongst a plurality of autocorrelated lobes comprised in the autocorrelated signal,
wherein the windowed difference magnitude cross correlation output is further based on a range of distance of the user from the plurality of microphones.

* * * * *